United States Patent

Bossen

[15] 3,697,948

[45] Oct. 10, 1972

[54] APPARATUS FOR CORRECTING TWO GROUPS OF MULTIPLE ERRORS

[72] Inventor: Douglas C. Bossen, Wappingers Falls, N.Y.

[73] Assignee: International Business Machines Corporation, Armonk, N.Y.

[22] Filed: Dec. 18, 1970

[21] Appl. No.: 99,490

[52] U.S. Cl. ................340/146.1 AL, 340/146.1 AV

[51] Int. Cl. .............................................G06f 11/00

[58] Field of Search...............340/146.1, 146.1 AL, 340/146.1 AG, 146.1 AV

[56] References Cited

UNITED STATES PATENTS

| | | | |
|---|---|---|---|
| 3,478,313 | 11/1969 | Srinivasan | 340/146.1 |
| 3,562,709 | 2/1971 | Srinivasan | 340/146.1 |
| 3,582,878 | 6/1971 | Bossen | 340/146.1 |
| 3,601,798 | 8/1971 | Hsiao | 340/146.1 |

*Primary Examiner*—Charles E. Atkinson
*Attorney*—Hanifin and Jancin and Harold H. Sweeney, Jr.

[57] ABSTRACT

Apparatus including a decoder adapted for recovering the data from a received message corresponding to the sent message but which may be in error wherein the blocks of data consist of $k$ bytes of data ($D_0$, $D_1$, $D_2$,...$D_{k-1}$) each of $b$ bits. The sent message comprises the $k$ bytes of data plus two check bytes $C_1$ and $C_2$, each of $b$ bits. The decoder is effective in recovering the data without error when not more than two of the bytes are in error no matter how many bits may be in error in the two bytes. Pointers are required which indicate the two bytes containing errors. In the absence of the pointers or in the presence of a single false pointer, the decoder is effective in recovering the data without error when not more than a single byte is in error no matter how many bits may be in error in the single byte. The message is encoded by computing the check bytes according to the relationship:

$C_1 = ID_0 \quad ID_1 \quad \ldots \quad ID_{k-1}$ $C_2 = ID_0 \quad T D_1 \quad T^2 D_2 \quad \ldots \quad T^{k-1} D_{k-1}$ wherein $I$ is the identity element and $T, T^2, \ldots, T^{k-1}$ are distinct non-zero elements of Galois Field ($2^b$) wherein the indicated multiplication and addition are the Galois Field defined operations, and wherein $b$ is an integer $> 1$ and $k$ is an integer $2 < k < 2^b$.

12 Claims, 21 Drawing Figures

INVENTOR
DOUGLAS C. BOSSEN

BY

ATTORNEY d-SIGNALS

APPARATUS FOR CORRECTING TWO GROUPS OF MULTIPLE ERRORS

BACKGROUND OF THE INVENTION

This invention relates to error correcting codes, and more particularly, to an error correcting code which, by the use of pointers, is capable of correcting two bytes of multiple errors.

In data communication systems as well as computers, the information can be coded by adding redundant bits to the data message in such a way that the message can be decoded with a practical amount of apparatus to obtain the original information corrected in the event an error has been introduced. Parallel data arrangements, that is, the information is contained in parallel bytes arranged in a block of data, are used in computers and are well known especially in multi-channel recording apparatus. In co-pending application Ser. No. 10,837, filed on Feb. 12, 1970, now U.S. Pat. No. 3,629,824 encoding and decoding apparatus is disclosed in which the redundant or check bits are associated with the data in a cross byte or cross track direction. This co-pending application sets forth a code capable of correcting one or more errors within a single, multiple-bit byte of data. The data is divided into blocks which consist of $k$ bytes of data $D_0$, $D_1$, $D_2$,...,$D_{k-1}$ (each of $b$ bits), plus two check bytes $C_1$ and $C_2$, each of $b$ bits. The decoder is effective in recovering the data without error when not more than a single byte of the received message is in error no matter how many bits may be in error in the single byte. The present invention utilizes the above-identified code but extends the capabilities thereof by combining therewith pointer signals which extend the error correcting capability of the arrangement to two bytes in error regardless of the number of bits in error in each byte.

SUMMARY OF THE INVENTION

It is an object of the present invention to provide an encoding and decoding system which provides information as to which bytes are in error and extends the error correcting capabilities of the system to two bytes of data in error.

The code has $k$ data byte positions 0, 1,...,k−1 and two check byte positions $k$, $k+1$. Therefore, the whole message has a length $k+2$, or positions numbered 0, 1 1,...,$k+1$. In a multi-track tape system, for example, each block of data has each of its bytes on a different track so that the code extends across the tracks, each track representing an information byte position. The check bytes, when they are generated, are each placed on further parallel tracks adjacent to the information tracks. The system generates $i$ and $j$ pointer signals $p_0$, $p_1$,...,$p_k+_1$ where $i$ represents the track position of the "-first" error signal and $j$ represents the track position of the "second" error signal. Expressed algebraically, $$0 \leq i \leq j \leq k+1.$$

Each pointer signal is associated with a particular track so that the $i$ and $j$ error signals each designate a particular track, thus indicating which bytes of the multiple bytes are in error.

Signals referred to as "distance" signals $d_m$ are generated where $d_m = 1 <=> j - i = m$, which clearly can have values 1, 2,...,$k+1$. The distance signals represent the distance between the $i$ and $j$ error signal bytes. Since the values of $j$–$i$ which are $k$ or $k$+$l$ indicate an error in one of the check bytes, and since errors in the check bytes are handled without reference to the "distance" signals, the set of "distance" values is restricted to the set 1, 2, ...,$k-1$, that is, $d_1$, $d_2$,...,$d_{k-1}$.

Single track correction in the "random mode" is performed in the event of a non-zero syndrome whether or not there is a single "pointer" given. Proper correction is accomplished even if a "false" pointer is provided and there exist errors in a single byte which is not indicated or pointed to. This single track correction is essentially the same single track correction set forth in the above identified application Ser. No. 10,837.

The encoder computes the check bytes $C_1$ and $C_2$ according to the relationships:

$$C_1 = ID_0 \oplus TD_1 \oplus .. \oplus ID_{k-1}$$

$$C_2 = I\,D_0 \oplus T\,D_1 \oplus T^2\,D_2 \oplus ...T^{k-1}$$

wherein $I$ is the identity element and $T$, $T^2$ ....$I^{k-1}$ are distinct, non-zero elements of Galois Field $(2^b)$, wherein the indicated multiplication and addition are the Galois Field defined operations, and wherein $b$ is an integer > 1, and $k$ is an integer $2 < k < 2^b$.

The decoder computes two expressions known as the syndromes, where $D'_0$, $D'_1$,...,$D'_{k-1}$, $C'_1$, $C'_2$, are the received message bytes which may have errors in up to two tracks $i$ and $j$:

$$S_1 = ID'_0 \oplus ID'_1 \oplus ID'_2 \oplus ... \oplus ID'_{k-1} \oplus C'_1$$

$$S_2 = ID'_0 \oplus TD'_1 \oplus T^2\,D'_2 \oplus ... \oplus T^{k-1}\,D'_{k-1} \oplus C'_2$$

In the presence of error patterns $e_i$ and $e_j$ in tracks $i$ and $j$, $S_1$ and $S_2$ have the algebraic equivalent:

$$S_1 = e_i \oplus e_j \text{ and}$$

$$S_2 = I^i e_i \oplus T^j e_j.$$

These expressions can be solved for $e_i$ and $e_j$ to obtain:

$$e_i = S_1 \oplus (T^{j-1} \oplus I)^{-1}(I^{-1} S_2 \oplus S_1) \text{ and}$$

$$e_j = (TJ^{-}i \oplus I)^{-1}\,(T^{-i}\,S_2 \oplus S_1).$$

The expressions for $e_i$ and $e_j$, represent the error pattern in the groups of data or bytes $i$ and $j$, respectively. The received message data and the error patterns along with various control signals can be properly combined to produce the correct data $\hat{D}_0$, $\hat{D}_1$,...,$\hat{D}_{k-1}$. The ^ symbol refers to the corrected data.

The foregoing and other objects, features and advantages of the invention will be apparent from the following more particular description of a preferred embodiment of the invention, as illustrated in the accompanying drawings.

Figure 2:
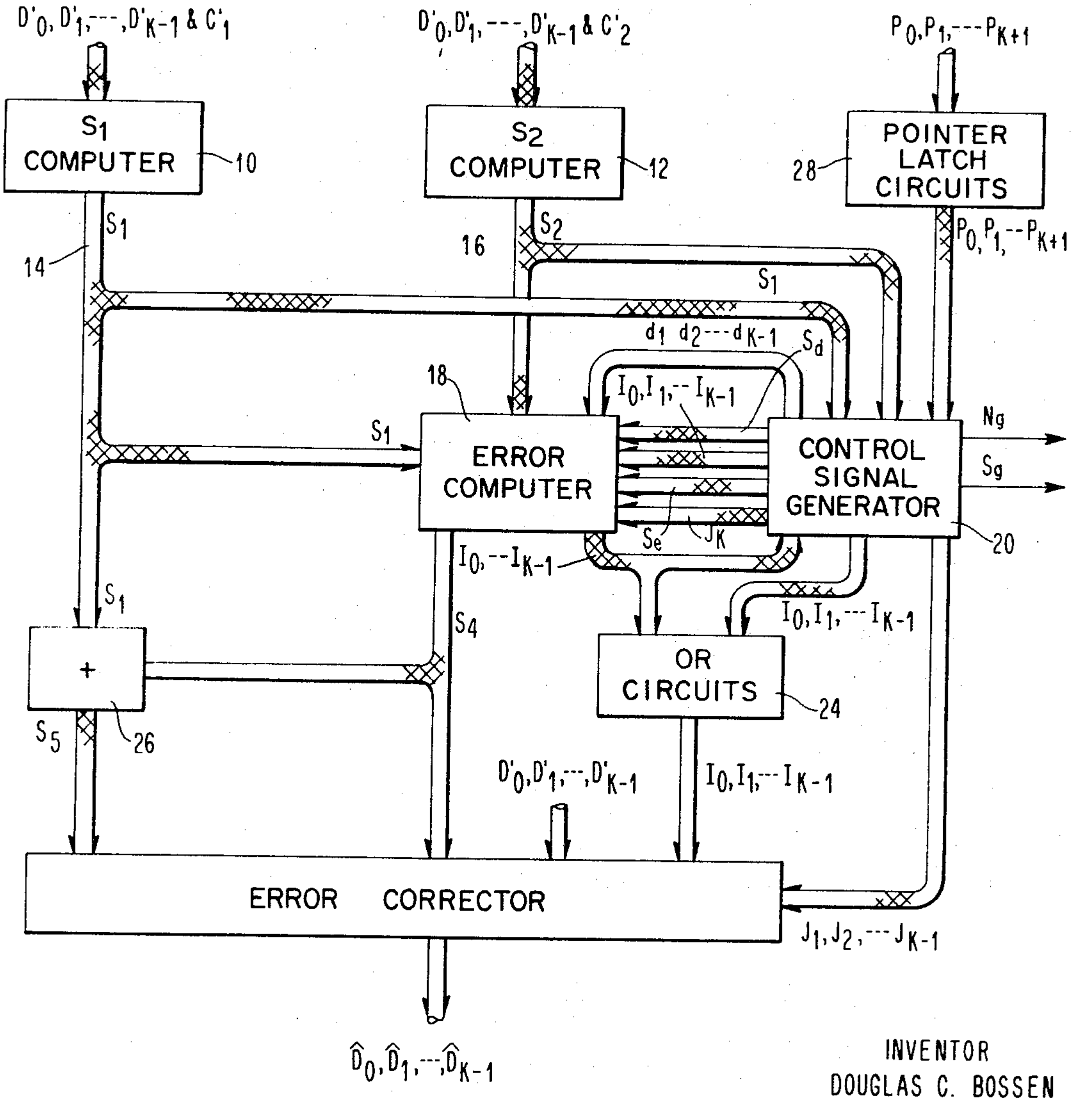
FIG. 2 is an abbreviated data processing flow diagram of a preferred form of the present invention.

FIGS. 7*a* through 7*e* are schematic diagrams showing more details of the control signal generator of FIG. 2.

Figure 3:
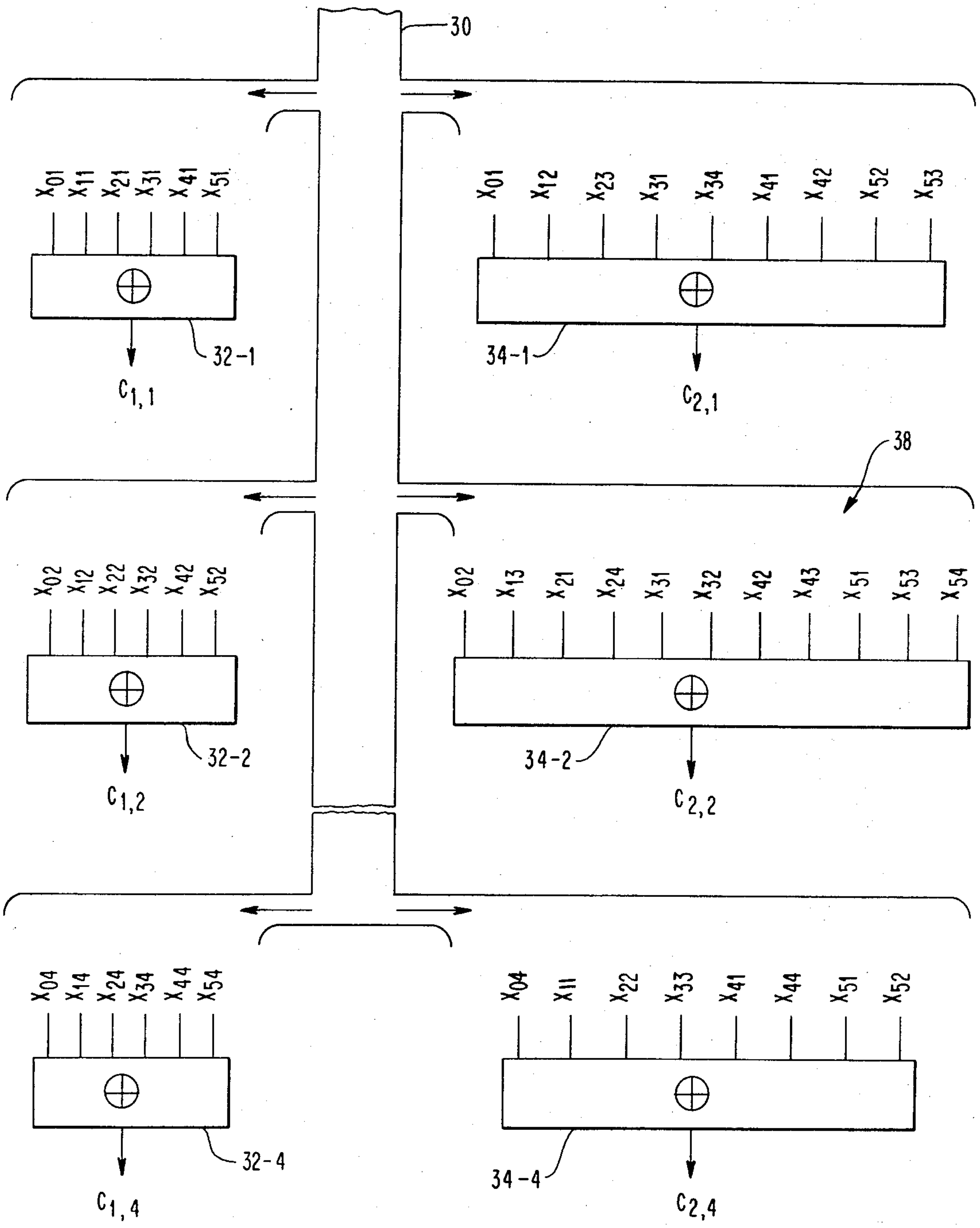
FIG. 3 is a schematic diagram showing the organization of the check bit computers $C_1$ and $C_2$.
Figure 8:
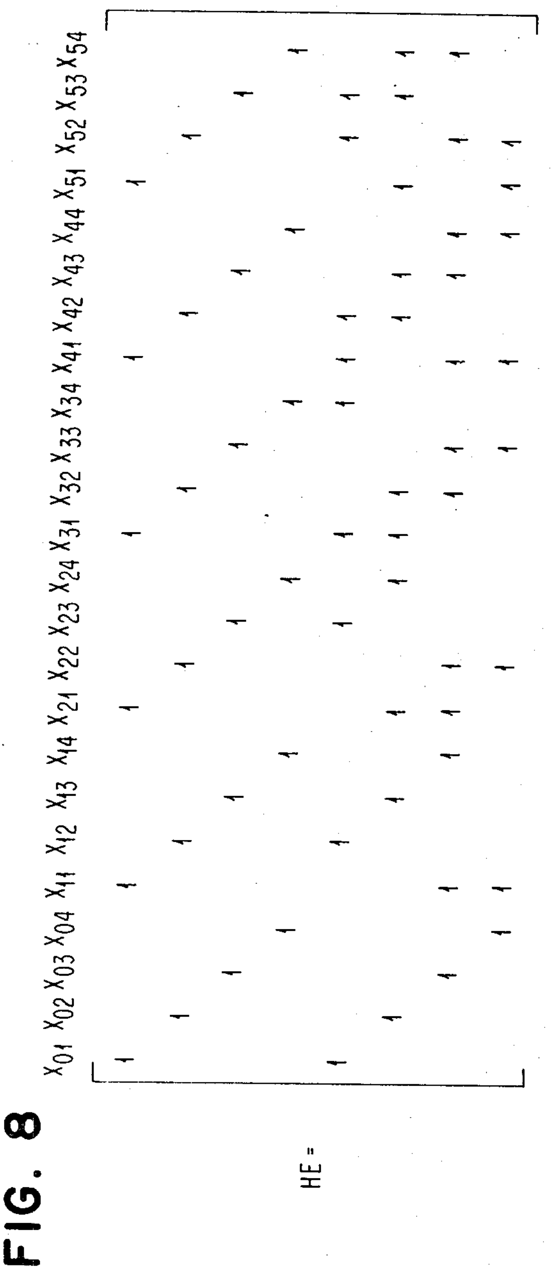

FIG. 8 shows the encoding matrix for the code represented in the check bit computer mechanization of FIG. 3.

Figure 4:
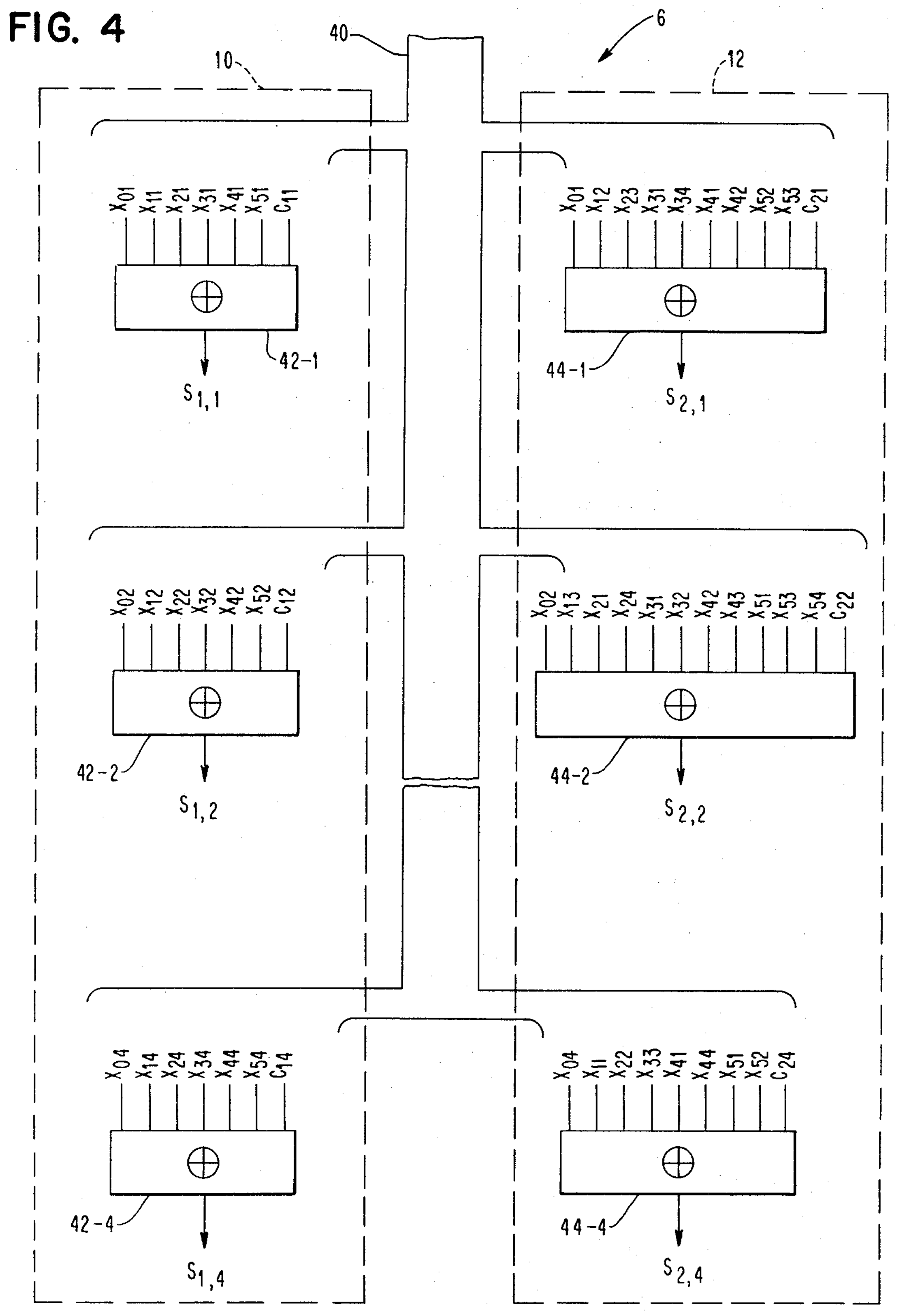
FIG. 4 is a schematic diagram showing the organization of the syndrome computers $S_1$ and $S_2$.
Figure 9:
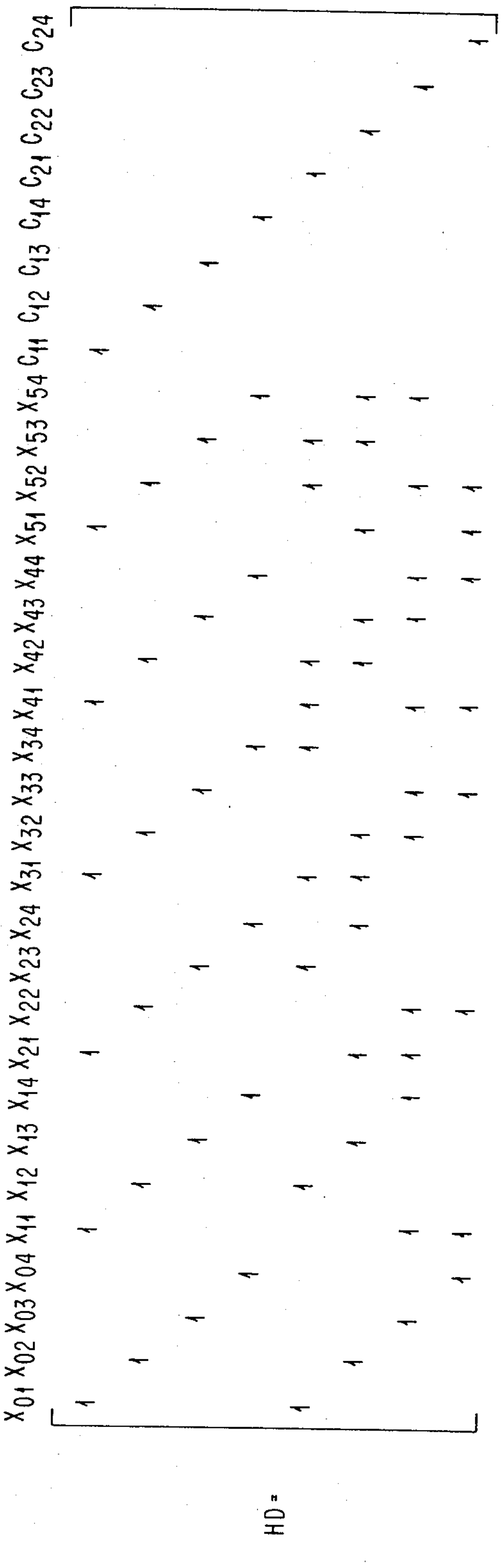

FIG. 9 shows the decoding matrix for the code represented in the syndrome computer mechanization shown in FIG. 4.

Figure 1:
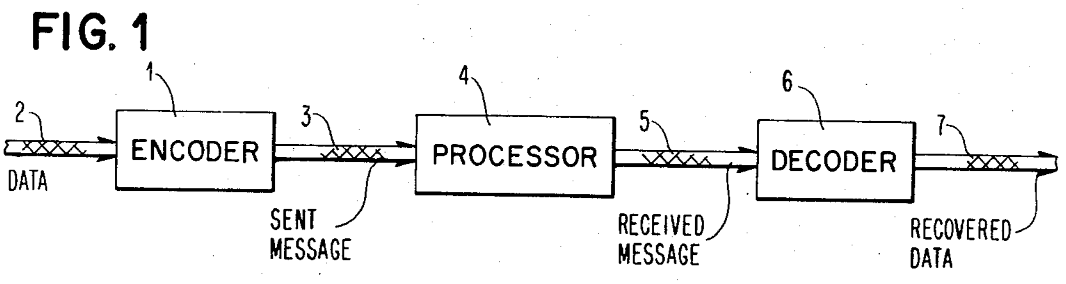
FIG. 1 shows a block diagram of a data handling system utilizing the present invention.
Figure 10:
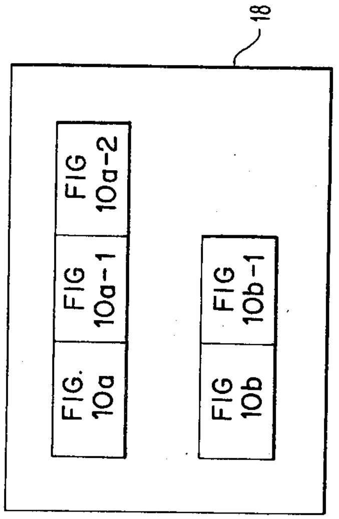
Figures 2, 10A:
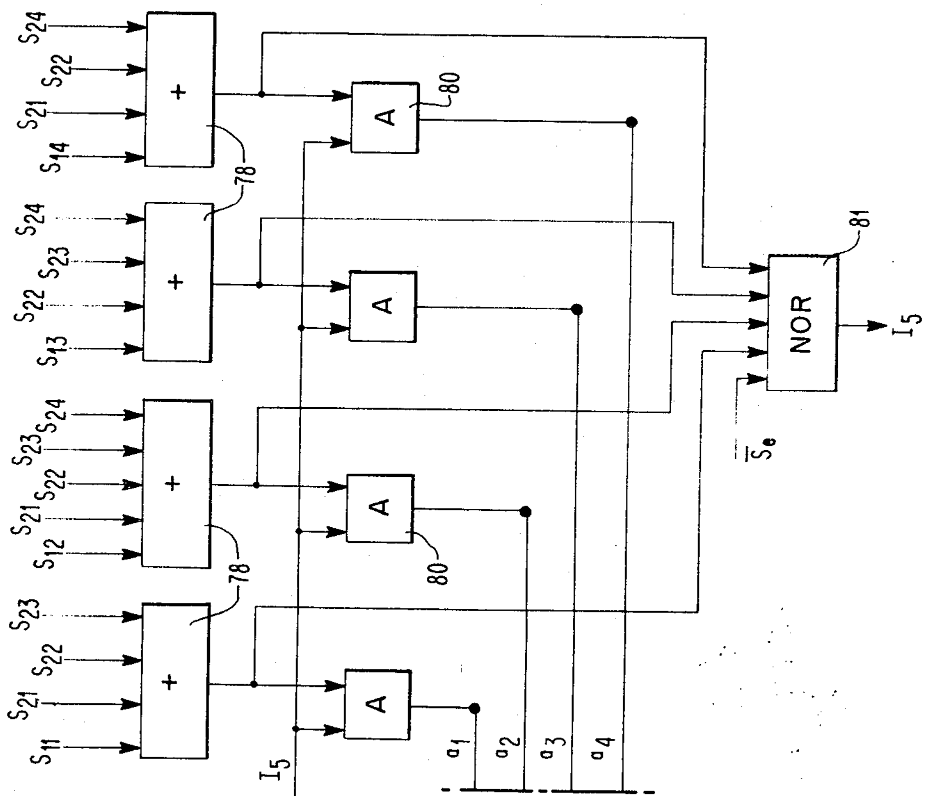
Figure 10A:
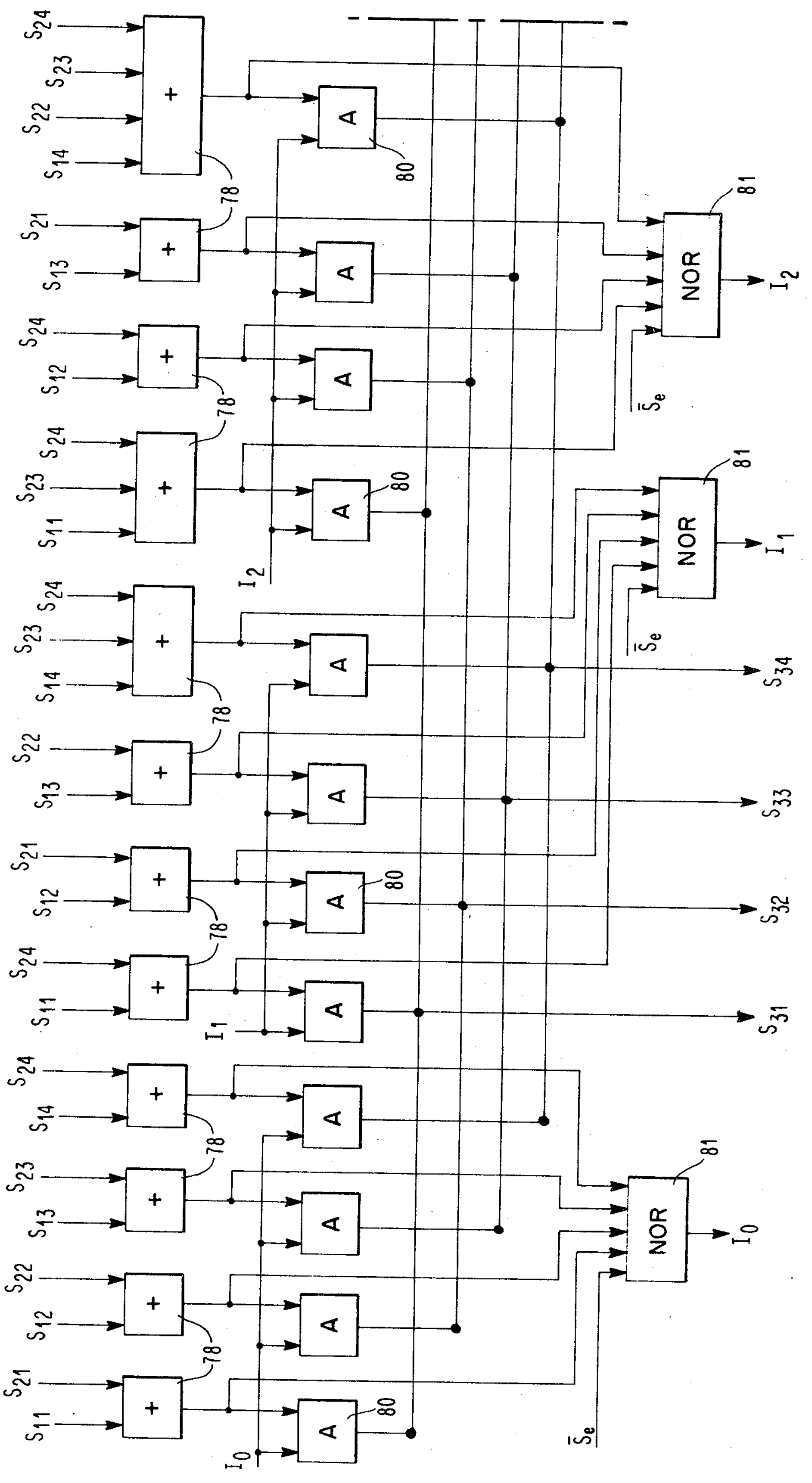
Figures 1, 10A:
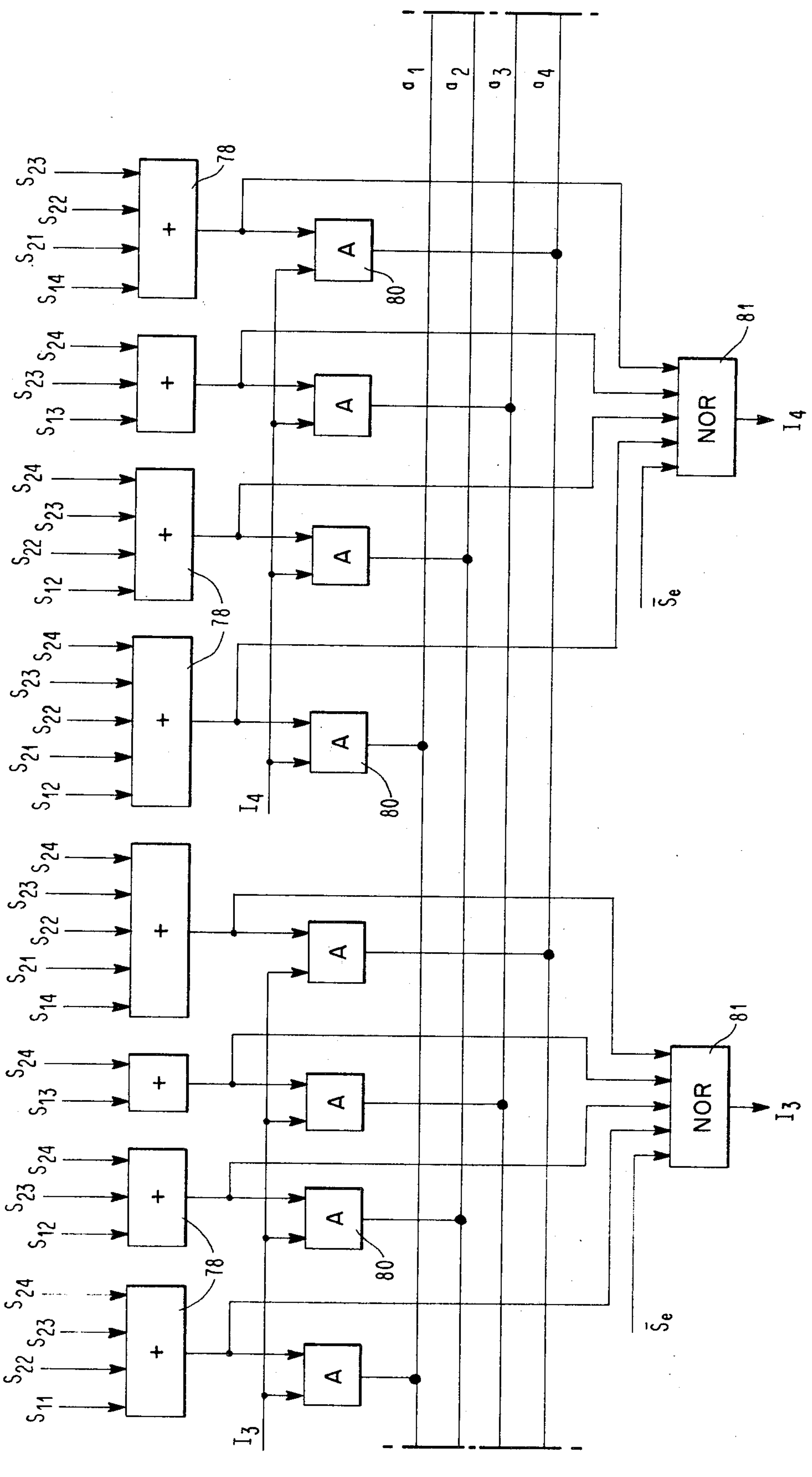

FIG. 10 illustrates that FIGS. 10*a*, 10*a*-1 and 10*a*-2 show more details of the mechanization of the error computer of FIG. 2.

Figure 10B:
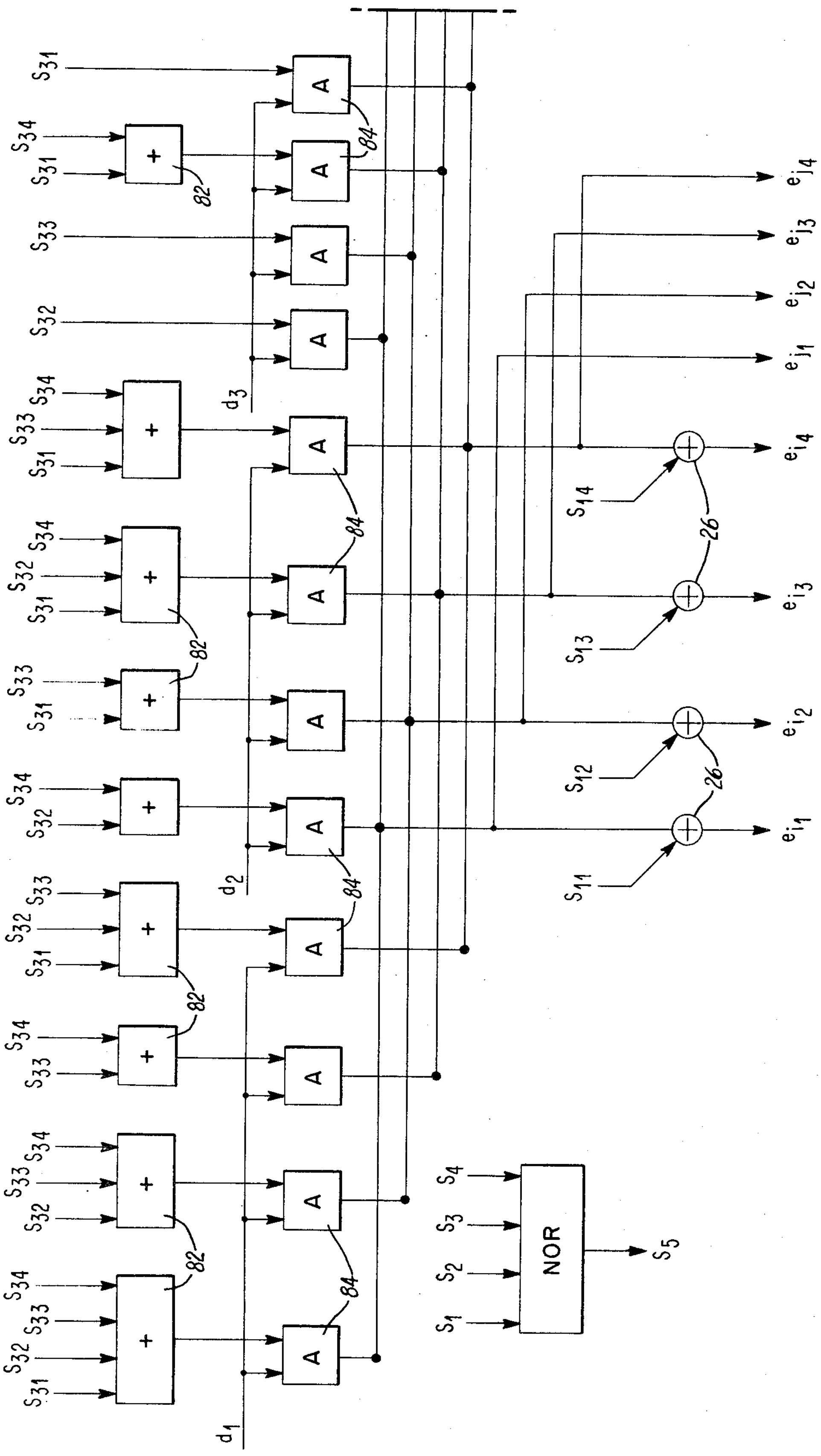
Figures 1, 10B:
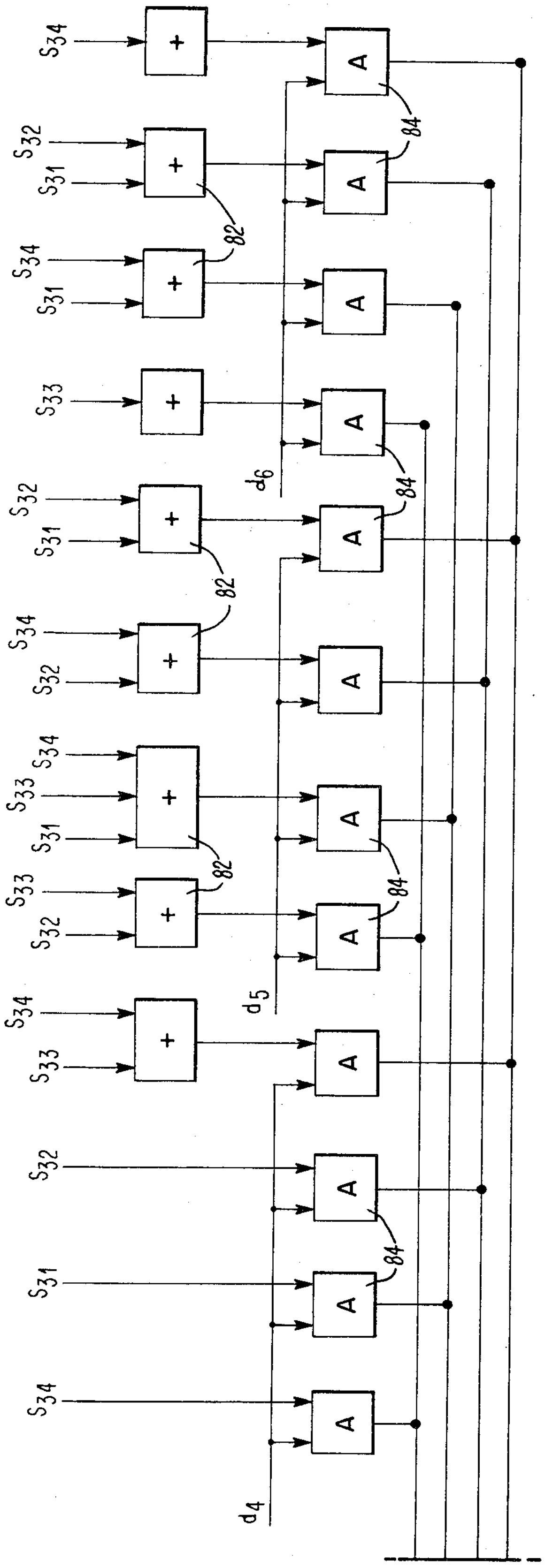

FIGS. 10*b* and 10*b*-1 show further details of the mechanization of the error computer of FIG. 2.

Figure 11:
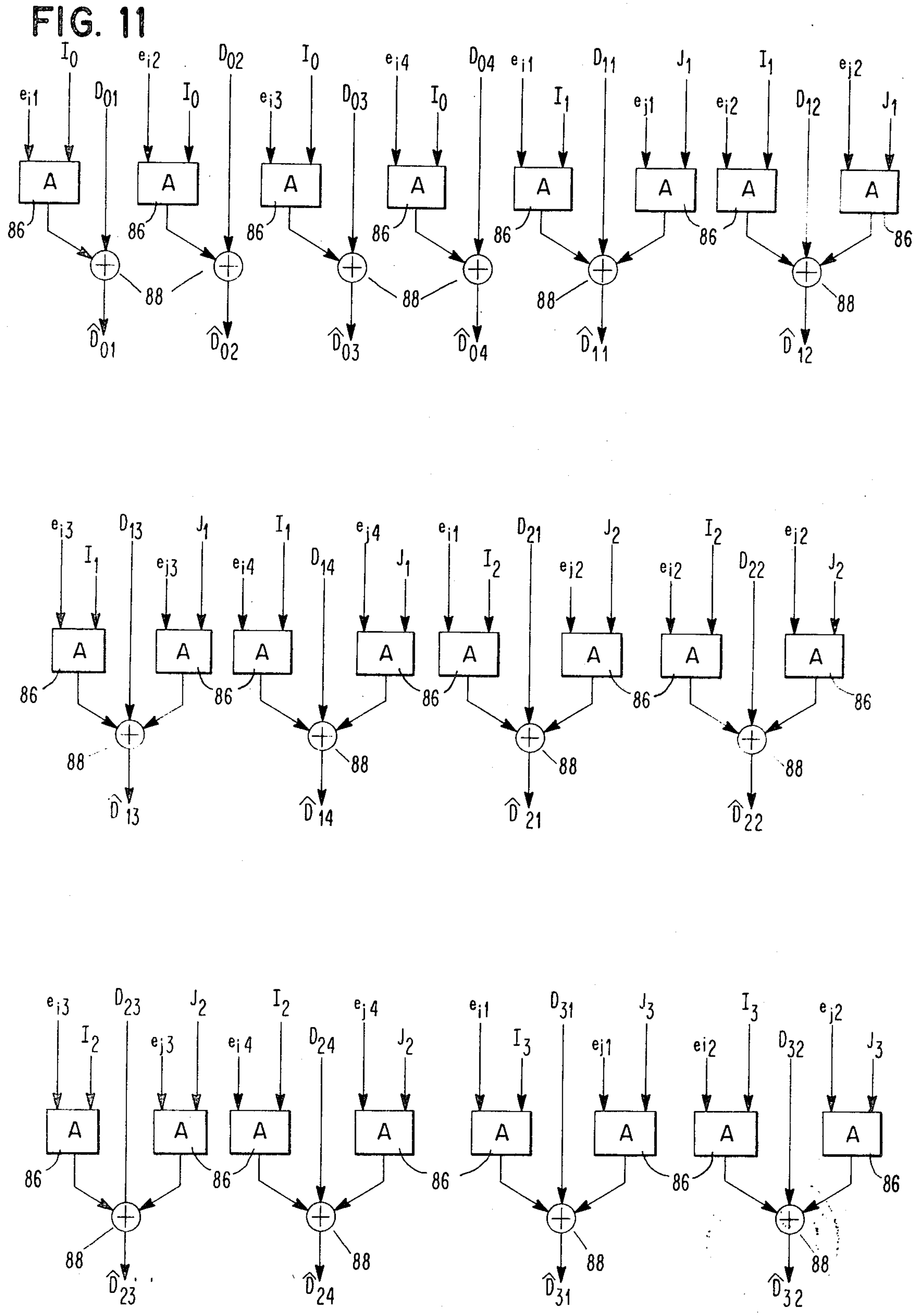
Figure 11A:
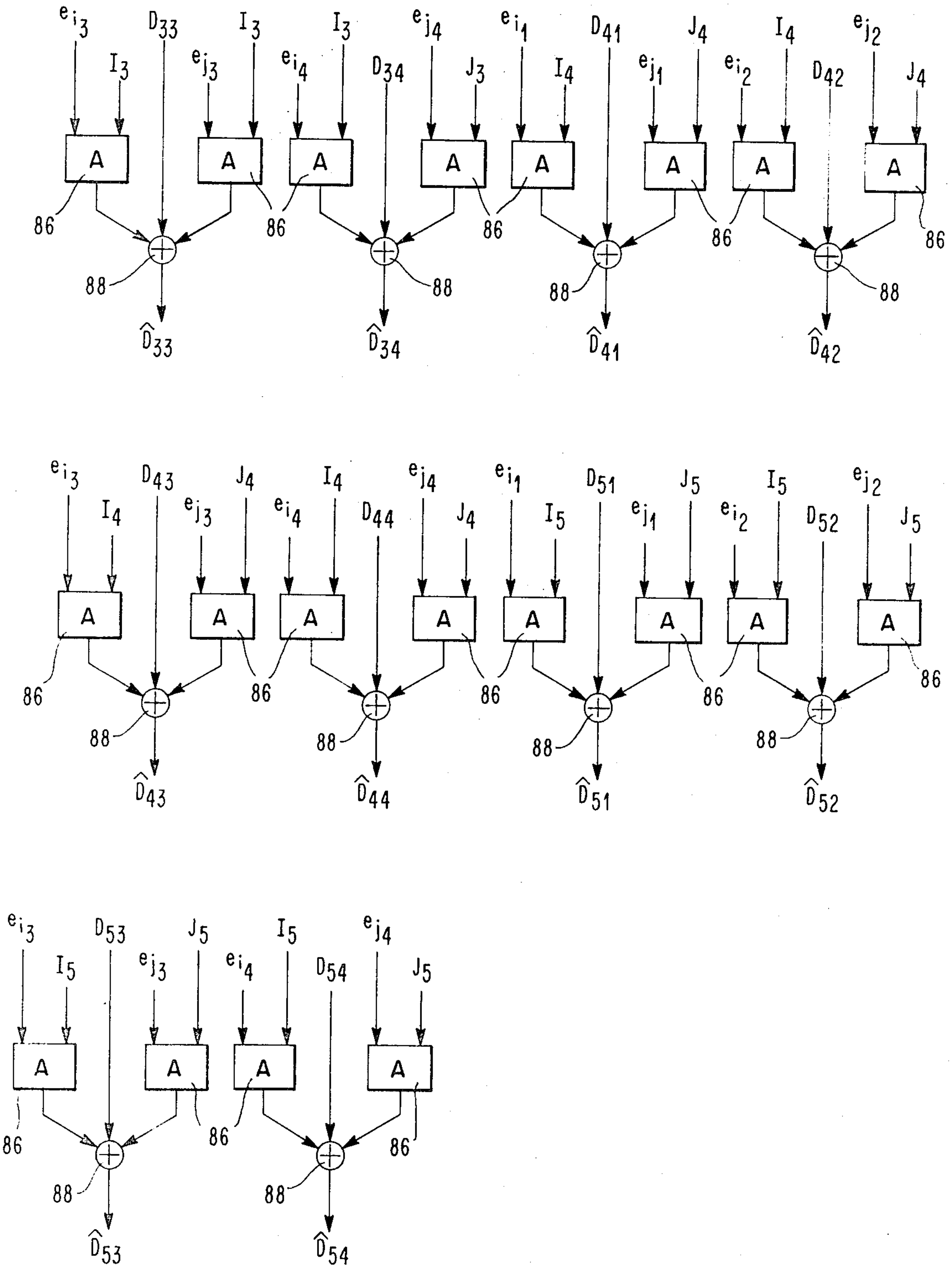

FIGS. 11 and 11a are a schematic diagram showing in more detail the error corrector circuits of FIG. 2.

Referring to FIG. 1, data enters an encoder 1 through a channel 2. Encoder 1 generates a sent message which passes through channel 3 to a processor 4 which performs some operation on the message, for example, storing it and subsequently reactivating it, and then transcribes a received message which passes through channel 5 to decoder 6 which decodes the received message and emits recovered data, which passes through channel 7 to some further use. The operation of processor 4 may be imperfect and make occasional errors so that the received message in channel 5 is not necessarily identical with the sent message in channel 3. The encoder 1 and decoder 6 cooperate to emit recovered data at channel 7 having fewer errors than are made by the processor.

It will be appreciated by those skilled in the art that this invention can be applied to information handling systems of various capacities. The invention, will, therefore, be first described in algebraic terms which are applicable to any size system and subsequently in terms of a specific system. The symbolism used throughout the application is the standard Boolean notation where:

+ = OR
= EXCLUSIVE OR
· = AND

According to the invention, data is processed by the system in blocks consisting of *k* bytes, each byte having *b* bits of data. Here and throughout, *b* designates an integer > 1 and *k* an integer $2 < k < 2^b$. The values of *b* and *k* are to be considered invariant for a particular embodiment, but are variously chosen for embodiments of various capacities. A block of data will accordingly be designated D, $D_1$, ..., $D_{k-B}$ where $D_0$ represents the first byte in the block, $D_1$ the second byte, and so on to $D_{k-1}$ which represents the *k*th and last byte. A representative byte of data will be designated $D_j$ with the subscript *j* assuming any integral value $0 \leq j \leq k\text{-}1$. According to the invention, the encoder calculates from the block of data two check bytes, (designated $C_1$ and $C_2$) each of *b* bits and appends the check bytes to the *k* data bytes to generate the sent message of $k + 2$ bytes.

In order to describe the calculation of the check bytes, it is convenient to note that for bytes composed of *b* binary bits there are $2^b$ distinct bytes possible and to regard each possible byte as an element of a Galois Field of $2^b$ elements (or $GF(2^b)$ ). The existence of $GF(2^b)$ is assured for any value of *b* by general theorems of algebra. (See for example, W. Wesley Peterson: *Error Correcting Codes*, M.I.T. Press, 1961). The Galois Filed implies two operations conventionally designated "addition" with the corresponding zero element $\theta$, and "multiplication" with corresponding identity element I. The terms "addition" and "multiplication" and related terms such as "adder" will be used in this sense throughout.

The rules of addition and multiplication of bytes are established by recognizing that the $GF(2^b)$ of possible bytes is isomorphic with the $GF(2^b)$ of polynomials with coefficients in GF(2) taken modulo an irreducible polynomial of degree *b*. At least one irreducible polynomial exists for any *b*. The field of such polynomials is a vector space of dimension *b* over GF(2). Addition of the elements in $GF(2^b)$ is therefore accomplished by addition of corresponding bits. Addition is of course in GF(2) and thus equivalent to addition modulo 2. Multiplication in $GF(2^b)$ can be thought of as defining a set of linear transformations in the corresponding vector space of dimension *b*.

The vector space is spanned by the column vectors:

$$\begin{pmatrix}1\\0\\0\\0\\.\\.\\.\\0\end{pmatrix}, \begin{pmatrix}0\\1\\0\\0\\.\\.\\.\\0\end{pmatrix}, \begin{pmatrix}0\\0\\1\\0\\.\\.\\.\\0\end{pmatrix}, \ldots \begin{pmatrix}0\\0\\0\\0\\.\\.\\.\\1\end{pmatrix} \quad (1)$$

(wherein the 0 and 1 are binary symbols), or more compactly expressed:

$$a^{b-1}, a^{b-2}, ..., a, I$$

wherein *a* is a primitive element of $GF(2^b)$. (i.e., every non-zero element of the field can be obtained by raising a to some power.) The transformation matrix corresponding to multiplication by element Q is given by catenation of the column vectors:

$$Qa^{b-1}, Qa^{b-2}, ..., Qa, QI \quad (2)$$

giving:

$$[\, T_Q = Qa^{b-1}\ Qa^{b-2}, ..., Qa, QI \,] \quad (3)$$

Multiplication of the element R by the element Q in $GF(2^b)$ is thus equivalent to multiplication of the vector R by the matrix $T_Q$ where the vector and matrix components are in GF(2). (i.e., binary bits.) These operations will be illustrated below in connection with a preferred embodiment.

Returning now to the data handling system, according to the invention, the encoder calculates the check bytes according to the relationships:

$$C_1 = TD_0 \oplus ID_{D1} ... \oplus ID_{k-1} \quad (4)$$

$$C_2 = ID_0 \oplus T D_1 \oplus T^2 D_2 ... \oplus T^{k-1} d_{k-1} \quad (5)$$

where T, $T^2$,...,$T^{k-1}$ are distinct, non-zero elements of $GF(2^b)$. Since there are $2^b$-1 such elements, the number of bytes in a block is limited to $k < 2^b$. It is convenient to express the relationships by which $C_1$ and $C_2$ are computed by an encoding matrix given the coefficients:

$$H_E = \begin{bmatrix} I & I & I & ... & I \\ I & T & T^2 & ... & T^{k-1} \end{bmatrix} \quad (6)$$

and the encoding calculation can be written symbolically:

$$C = H_E D \quad (7)$$

Employing the relationships developed above, the encoding matrix can be expressed in binary form by replacing each element of GF($2^b$) appearing in the encoding matrix by the corresponding binary multiplication matrix. The resulting form of the encoding matrix will give explicitly the operations to be performed by a binary-based computer to calculate the check bytes.

Turning now to the decoding, the decoder receives a received message:

$$D'_., D'_1, D'_2, ..., D'_{k-1}, C'_1, C'_2$$

of $k + 2$ bytes (the "′" symbol refers to the received message) and computes a two-byte syndrome ($S_1$, $S_2$) according to the relationships:

$$S_1 = D'_0 \oplus D'_1 \oplus D'_2 \oplus D'_{k-1} \oplus C'_1 \quad (8)$$

$$S_2 = ID_0 \oplus T D'_1 \oplus T^2 D'_2 ... \oplus T^{k-1} D'_{k-1} \oplus C'_2 \quad (9)$$

described by a decoding matrix with $k + 2$ columns and 2 rows:

$$H_D = \begin{bmatrix} & I & I & I & I & I & \theta \\ I & T & T^2 & ... & T_{k-1} & \theta & I \end{bmatrix} \quad (10)$$

where $\theta$ is the zero element in GF($2^b$). The calculation of the syndrome can be indicated symbolically:

$$S = H_D (D', c') \quad (11)$$

The decoding matrix $H_D$ can of course be expressed explicitly in binary form by substituting the binary multiplication matrices.

If I, T, $T^2$,...,$T^{k-1}$ are the non-zero elements of GF($2^b$) then to each such element $T^l$, there is an inverse element $T^{-l}$ such that $T^l T^{-l} = I$ which is the identity element.

The "pointer" signals are derived from the system in which the error correction is taking place. For example, each group of data may give rise to a parity check signal which is an indication of the byte of data associated therewith being in error. Of course, a parity check bit signal is produced for each byte of data or group of data, thereby indicating on an individual basis the byte or bytes of data in error. Of course, there are other means of generating "pointer" signals such as in set forth in corresponding U.S. patent application Ser. No. 40,836, filed May 26, 1970, entitled "Enhanced Error Detection and Correction For Data Systems" now U.S. Pat. No. 3,639,900. In this application, the quality of the record read back operations on a real time basis is used as pointers to possible error conditions. The significance of the syndrome $S_1$, $S_2$ together with the error pointers $P_0$, $P_1$,...,$P_{k+1}$ can be understood from a consideration of the following operations which can be readily derived from the encoding and decoding relationships on the supposition that at least all but the two bytes whose pointers are turned on have been correctly transcribed, or that at least all but one byte of the message have been correctly transcribed in the presence of no pointers turned on or one pointer turned on. If syndromes $S_1 = 0$ and $S_2 = 0$, then no error exists in the received message, regardless of whether or not two pointers are turned on. If no pointer or a single pointer is turned on and syndrome $S_1 = 0$ and $S_2$ is not equal to 0, then there is an error $C'_2$. If no pointer of one pointer is turned on and syndrome $S_1$ is not equal to 0 and $S_2 = 0$,, then there is an error in $C'_1$. If no pointer is turned on or if one pointer is one and $S_1$ is not equal to 0 and $S_2$ is not equal to 0, then an error of magnitude $S_1$ exists in data byte $D_j$ if, and only if, $S_1 = T^{-j} S_2$. Under these conditions, the decoder computes for each data byte a criterion from the equation $S_3 = T^{-j} S_2 \oplus S_1$ and generates the recovered data:

$\hat{D}_j = D'_j$ (if $S_3$ is not equal to 0)

$\hat{D}_j = D'_j \oplus S_1$ (if $S_3$ equals 0)

If the two error pointers $P_i$ and $P_j$ corresponding to data bytes $D'_i$ and $D'_j$ are turned on, then an error of a magnitude $S_5 = S_1 \oplus (1 \oplus T^{j-i})^{-1} (T^{-i} S_2 \oplus S_1) = e_i$ exists in data byte $D'_i$ and an error of magnitude $S_4 = (1 \oplus T^{j-i})^{-1} (T^{-i} S_2 \oplus S_1) = e_j$ exists in data byte $D'_j$. The decoder generates data according to:

$$\hat{D}_i = D'_i \oplus e_i \quad (P_i = 1)$$
$$\hat{D}_j = D'_j \oplus e_j \quad (P_j = 1)$$
$$\hat{D}_e = D'_e \quad (P_e = 0)$$

In particular, it should be recognized that the two data bytes $D'_i$ and $D'_j$ are recovered correctly even if multiple bits within each byte are in error.

If two pointers, one in the data portion $P_i$ corresponding to data $D_i$, and the $P_k$ corresponding to $C'_1$ are turned on, then an error of magnitude:

$$S_5 = S_1 \oplus T^{-i} S_2 \oplus S_1 = e_i$$

exits in data byte $D'_i$ so that $\hat{D}_i = D'_i \oplus e_i$ represents the corrected byte. It should be noted that the check byte $C'_1$ need not be corrected. If two pointers, one equal to $P_i$ corresponding to byte $D_i$ of the data and the other equal $P_{k+1}$ corresponding to $C'_2$ are turned on, then an error of magnitude $S_5 = S_1 = e_i$ exists in byte $D'_i$ so that $\hat{D}_i = D'_i \oplus e_i$ represents the corrected byte $D_i$.

The apparatus for providing the error correction as previously set forth is shown in block form in the diagram of FIG. 2. The coded data consisting of data bytes and check bytes $D'_0$, $D'_1$,...,$D'_{k-1}$, $C'_1$, $C'_2$ together with error pointers $P_0$, $P_1$,...,$P_{k+1}$ which serve as inputs to the system decoder 6. The data bytes as well as the check byte $C'_1$ are inputted to the $S_1$ syndrome computer 10 where the syndrome byte $S_1$ is computed according to the relationship:

$$S_1 = C'_1 \oplus D'_0 \oplus D'_1 \oplus ... \oplus D'_{k-1}$$

The data bytes and the second check byte $C'_2$ are fed into the $S_2$ computer 12 where the second syndrome byte $S_2$ is computed according to the relationship:

$$S_2 = C'_2 \oplus I D'_0 \oplus T^1 D'_1 \oplus ... \oplus T^{k-1} D''_{k-1}$$

The syndrome signals $S_1$ and $S_2$ actually consist of $b$ signals since there is an actual syndrome signal generated for each check bit in the $C_1$ and $C_2$ bytes. The syndrome signals $S_1$ and $S_2$ pass in parallel channels 14,16 to the error computer 18 and control signal generator 20. The error computer 18 also receives control signals $I_0$, $I_1$,...,$I_{k-1}$ and $S_3$ and from the syndrome bytes $S_1$ and $S_2$ computes a byte $S_3$ according to the relationship:

$$S_3 = S_1 \oplus T^{-i} S_2$$

if, and only if, $I_i = 1$. Otherwise, $S_3$ is equal to $S_1$. If $S_3$ is equal to 1 indicating signal byte correction, the error computer 18 also computes a set of control signals $I_i$, where $0 \leq i \leq k\text{-}1$ such that $I_i = 1$, if and only if $S_1 \oplus T^{-i} S_2$ is equal to 0. These I signals are sent to the error corrector 22 after being OR'ed with the I signals generated by the control signal generator 20 in OR circuits 24. The error computer 18 also receives control signals $d_1, d_2, \ldots, d_{k-1}$ and control signal $J_k$. The error computer computes the error byte $e_j$ according to the relationship:

$$S_4 = (1 \oplus T^{j-i})^{-1} S_3 = e_j$$

if, and only if, $d_{j-i} = 1$, otherwise $S_4 = S_3$ if, and only if, $J_k = 1$. Otherwise, $S_4 = 0$ if $j = K + 1$ (case when none of $J_1, J_2, \ldots, J_k = 1$). The $S_4$ output from the error computer 18 is also supplied to a modulo 2 adder 26 which has as the other input the syndrome byte $S_1$. The output of the modulo 2 adder circuit is $S_5 = e_i$ according to the relation $S_5 = S_1 \oplus S_4 = e_i$ which is fed to the error corrector 22. The error corrector 22 also receives the data bytes $D'_0, D'_1, \ldots, D'_{k-1}$ as well as the beforementioned control signals $I_0, I_1, \ldots, I_{k-1}$ and $J_1, J_2, \ldots, J_{k-1}$. These inputs and the bytes $e_i$ and $e_j$ are utilized to produce the corrected data $\hat{D}_0, \hat{D}_1, \ldots, \hat{D}_{k-1}$ according to the relations:

$$\hat{D}_0 = D'_0 \oplus T_0 . e_i$$

$$\hat{D}_1 = D'_1 \oplus (I_1 . e_i) \oplus (J_1 . e_j)$$

$$\hat{D}_2 = D'_2 \oplus (I_2 . e_i) \oplus (J_2 . e_j)$$

.

.

.

$$\hat{D}_{k-1} = D'_{k-1} \oplus (T_{k-1} . e_i) \oplus (J_{k-1} . e_j)$$

The control signal generator 20 receives the syndrome bytes $S_1$ and $S_2$ from the respective $S_1$ and $S_2$ computer 10,12. In addition, pointer signals $P_0, P_1, \ldots, D_{kBH1}$ are received from the pointer latch circuits 28. From these inputs, the control signal generator 20 generates the following signals:

1. $NP_1 = 1$ if, and only if, exactly one pointer is turned on;
2. $NP_2 = 1$ if, and only if, exactly two pointers are on;
3. $N_{01} = 1$ if, and only if, zero or one pointers are on;
4. $N_3 = 1$ if, and only if, three or more pointers are on;
5. $S_0 = 1$ if, and only if, both syndrome bytes $S_1$ and $S_2$ are 0;
6. $S_3 = 1$ if, and only if, $N_{01} = 1$ and $S_0 = 0$;
7. I signals giving locations of the "first" pointer if, and only if, $S_3 = 0$.
8. J signals giving the location of the "second" pointer if, and only if, $S_e = 0$; and
9. $d$ signals giving the value of J-I.
10. $S_d = 1$ if, and only if, exactly 1 of the syndrome bytes is non-zero;

$$S_d = \overline{(S_{11} + S_{12} + S_{13} + S_{14})} \oplus \overline{(S_{21} + S_{22} + S_{23} + S_{24})}$$

11. $S_g = S_0$ OR $S_3 . S_d$;
$S_g = 1$ if, and only if, DATA is good;
12. $N_g = 1$ if, and only if $N_3 = 1$ or if $S_3 = 1$ and $S_d = 0$ and none of the I signals are active.

The distance signals $d_1, d_2, \ldots, d_{k-1}$ and the I or "first" pointer signals $I_0, I_1, \ldots, I_{k-1}$ and the $S_e$ signal are utilized as inputs to the error computer 18 for the computation of $S_4$. The error computer also computes a set of control signals if $S_e$ is equal to 1. These control signals $I_i$ are generated where $0 \leq I \leq k\text{-}1$ such that $I_i$ is equal to 1, if, and only if, $S_1 \oplus T^{-i} S_2$ is equal to 0. These I signals $I_0 \ldots I_{k-A1}$ are sent from the error computer 18 to OR circuits 24 where they are OR'ed with the I signals $I_0, I_1, \ldots, I_{kA)1}$ from the control signal generator 20. These T signals are also sent to the control signal generator 20 indicating by the presence of one and only one I signal that single byte correction can be done. The resulting output of the OR circuits 24 should be $I_0, I_1, \ldots, I_{k-1}$ which are utilized as the I signals input to the error corrector 22. the control signal generator 20 also produces the J signals $J_1, J_2, \ldots, J_k$ which are connected as inputs to the error corrector 22 designating the location of the second byte in error.

The pointer latch circuits 28 receive as inputs pointer signals $P_0, P_1, \ldots, P_{k+1}$ which are essentially error detecting signals such as parity signals, one from each track or byte in the block of data. These pointer signals set their respective latch to its 1 condition for each byte which has an error. The condition of each latch is emitted by the pointer latch circuits as signals (called pointer signals) $P_0, P_1, \ldots, P_{k+1}$ which serve as the pointer signals connected to the control signal generator 20.

The pointer signals $P_0, P_1, \ldots, P_{k+1}$ are a set of single bit signals each of which are either 0 or 1. $P_i$ being equal to 1 means that track I has detected errors and $P_i = 0$ indicates that track I does not have detected errors. The I and J signals are derived from the pointer signals. The I signals and J signals which serve as inputs to the error connector are derived as follows:

$$I_o = P_0 \qquad J_1 = P_1 \cdot \overline{I_1}$$

$$I_1 = P_1 \cdot \overline{P_0} \qquad J_2 = P_2 \cdot \overline{I_2}$$

$$I_2 = P_2 \cdot \overline{P_1} \cdot \overline{P_0}$$

.

.

.

$$J_k = P_k \cdot \overline{I_k}$$

$$I_k = P_k \cdot \overline{P_{k-1}} \cdot \overline{P_{k-2}} \ldots \overline{P_0}$$

where $I_i = 1$, indicates that the first track in error is track $i$ and where $J_j = 1$, indicates that the second track in error is track $j$. In the above equations, the $\overline{P}_i$ indicates the inverse of the function and the mathematical step indicated is the AND function.

The previously mentioned distance signals $d$ which indicate the distance between the J and I bytes in error, are derived from the I and J signals as follows:

$$d_1 = I_0 \cdot J_1 + I_1 \cdot J_2 + \ldots + I_{k-2} \cdot J_{k-1}$$

$$d_2 = I_0 \cdot J_2 + I_1 \cdot J_3 + \ldots + I_{k-3} \cdot J_{k-1}$$

.

.

$$d_{k-1} = I_0 . J_{k-1}$$

where $d_i = 1$, indicates that the integer distance between the $i$ signal and the $j$ signal is $i$. It should be noted that in the determination of $d_{k-1}$, the signal $I_1 . J_k$ is not used. $J_k = 1$ will be treated as a special case. It should also be noted that none of the $i$ signals, $j$ signals or $d$ signals contain a $J_{k+1}$ signal. This will also be treated as a special case.

In operation, where two of the pointers indicate separate bytes in error, then one $I_i$ one $J_i$ and one $d_i$ will be turned on by indicating a 1. The situation where only one $P_i$ indicates a 1 for a byte in error will be handled as a special case. The value $J_{k+1}$ is assumed in the two pointer case when none of the other $J_i$'s equal 1.

The operation of the invention can best be seen by consideration of a number of different examples of error situations. The first example is the situation where two bytes in the block of data contain errors in the data portion $D'_0, D'_1, \ldots, D'_{k-1}$ of the message and two pointers are obtained indicating the bytes in error. Assuming that the bytes i and j are indicated by the pointer signals to be in error where $0 \leq i < j \leq k-1$. Under these conditions, the control signal generator 20 will produce signals $I_i = 1$ and $J_j = 1$ and accordingly, $d_{j-i} = 1$ will be produced. Assuming that the two bytes in error and that the other bytes are transcribed properly, then the syndrome bytes $S_1$ and $S_2$ which are generated from the $S_1$ and $S_2$ computers 10,12, respectively, will not both equal 0 since the two bytes are in error. Syndrome $S_1$ is algebraically equal to:

$$S_1 = e_i \oplus e_j \quad (12)$$

where $e_i$ represents the error pattern in byte $i$ and $e_j$ represents the error pattern in byte $j$. The second syndrome byte $S_2$ is algebraically equal to:

$$T^i e_i \oplus T^j e_j = S_2 \quad (13)$$

The above-noted equations (12) and (13) can be solved for $e_i$ and $e_j$. Multiplying equation (12) by $T^{-i}$ we get: $T^{-i} S_2 = e_i \oplus T^{j-i} e_j$ (14)

Adding equation (12) to equation (14) we get: $S_3 = T^{-i} S_2 \oplus S_1 = (T^{j-i} \oplus 1) e_j$ (15)

Multiply equation (15) by $(T^{j-i} \oplus 1)^{-1}$ we get:

$$S_4 = (T^{j-i} \oplus 1)^{-1} S_3 = e_j \quad (16)$$

The byte $S_4$ is algebraically equivalent to $e_j$. It will be appreciated that the above-identified equations or steps are performed by the error computer 18. The output $S_4 = e_j$ is utilized as one of the inputs to the modulo 2 adder circuit 26. The other input to the modulo 2 adder circuit is $S_1$ which as previously mentioned, $S_1 = e_i \oplus e_j$. Thus, the modulo 2 adder circuit 26 with output $S_5$ is performing the function $S_5 = S_1 \oplus S_4 = e_1$ which is algebraically equivalent to $e_i \oplus e_j \oplus e_j$ which is equivalent to $e_1$. The $S_5$ and $S_4$ bytes of data serve as inputs to the error corrector 22. The error corrector 22 EXCLUSIVE OR's the received data with the derived error pattern bytes $e_i$ and $e_j$ to produce the correct data $\hat{D}_i$ and $\hat{D}_j$.

The second example is similar to the first in that the pointers $P_0, P_1, \ldots, P_{k+1}$ indicate that two bytes are in error. However, one of the bytes in error is in the data portion $D'_0, \ldots, D'_{k-1}$ and the other byte in error is the first check byte $C'_1$. Assume that the data byte $D'_i$ has the error pattern $e_i$ and that the check byte $C'_1$ contains the error pattern $e_j$. In this case, the control signal $I_i = 1$ and $J_k = 1$. It should be noted that $J_k = 1$ is one of the special situations mentioned previously and in this case, none of the distance signals $d_i$ is equal to 1. The $S_1$ syndrome computer 10 produces the syndrome byte $S_1$ which has the algebraic value $e_i \oplus e_j$. The $S_2$ computer 12 produces the second syndrome byte $S_2$ which has the algebraic value $T^i e_i$. The error computer 18 produces the syndrome byte $S_3 = T^{-i} S_2 \oplus S_1$ which has the algebraic value $e_j$. According to its definition for the case of $J_k = 1$, the output of the error computer 18 is $S_4 = S_3$ which is equal to $e_j$. As in example (12) given above, the modulo 2 adder circuit has as inputs $S_1$ and $S_4$ and produces as an output the byte $S_5 = S_1 \oplus S_4$ where $S_1 = e_1 \oplus e_j$ and $S_4 = e_j$. Thus, $S_5$ is equal to $e_i \oplus e_j$ which is equal to $e_i$. The error corrector 22 receives $S_5 = e_i$ and the control signal $I_i$ and produces the correct data byte $\hat{D}_i = D_i \oplus e_i$.

The third example is the situation where two bytes are indicated as being in error by pointers $P_0, P_1, \ldots, P_{k+1}$. The one byte being in the data portion $D_0, \ldots, D_{k-1}$ of the message, and the second byte being the second check byte $C_2$. Thus, the message can be considered as having error pattern $e_i$ and $C_2$ having error pattern $e_j$. In this case, the control signal $I_i = 1$ and none of the $j$ signals $J_1, J_2, \ldots, J_k$ are equal to 1. Accordingly, none of the distance signals $d_1, d_2, \ldots, d_{k-1}$ are equal to 1. The syndrome byte $S_1$ generated by the $S_1$ computer 10 has the algebraic value $e_i$. The second syndrome byte $S_2$ which is generated by the $S_2$ computer 12 has the algebraic value $T^i e_i \oplus e_j$. As mentioned previously, $J = k + 1$ is a special case and the error computer 18 produces as an output $S_4 = 0$. Accordingly, the modulo 2 adder 26 receives as inputs $S_1 = e_i$ and $S_4 = 0$. This circuit produces $S_5 = e_i$ which is utilized by the error corrector to produce $\hat{D}_i = e_i \oplus \hat{D}_i$ which is the correct data byte.

The fourth example is the case where one of the syndromes $S_1$ or $S_2$ is not 0, and either 1 or 0 pointers indicates either 1 or no bytes in error. The signal $S_d = 1$ implies that one of the check bytes has the error and hence the data is good. The combination of signals $N_{01} \cdot \overline{S_0} = 1$, which is equal to $S_3$ controls the single byte correction. In this example, one of the data bytes $D_0, \ldots, D_{k-1}$ contains the error. Assuming $D_i$ has the error pattern $e_i$. The $S_1$ computer 10 computes the syndrome byte $S_1$ which has the algebraic value $e_i$. The $S_2$ computer 12 computes the syndrome $S_2$ which has the algebraic value $T^i e_i = S_2$. Now, under control of signal $S_e = 1$, signals $T^{-i} S_2 \oplus S_1$ are tested for the condition $T^{-i} S_2 \oplus S_1 = 0$. This equation will equal 0 for one and only one value of $i$. If it does not become zero, then uncorrectable multiple errors exist. The particular value of i for which this will be true will be $I_i$, since $T^{-i} S_2 \oplus S_1 = T^{-i} (T^i e_i) \oplus e_i$ which equals $e_i \oplus e_i$ which equals 0. The $S_4$ output is defined to be 0. $I_i$ is then used as the correction pointer in the error corrector 22 circuits to indicate which data byte $D_i$ should be EXCLUSIVE OR'ed with $S_5 = S_1 \oplus S_4 = e_i$ to obtain the corrected data $\hat{D}_i = D_i \oplus e_i$. In other words if the error pattern or error byte is EXCLUSIVE OR'ed with the received data byte that is in error, the original correct data is obtained. These I signals are also sent to the control signal generator 20 to make the decision as to whether or not uncorrectable errors exist.

The foregoing examples take care of all the situations which can occur that can provide correction of the data. In the event that more than two pointers indicate errors, or if $T^{-i} S_2 \oplus S_1$ never became 0 in single byte correction, then the control signal generator 20 will essentially put out a signal $N_g$ indicating that the data is in error and cannot be corrected.

Figure 5:
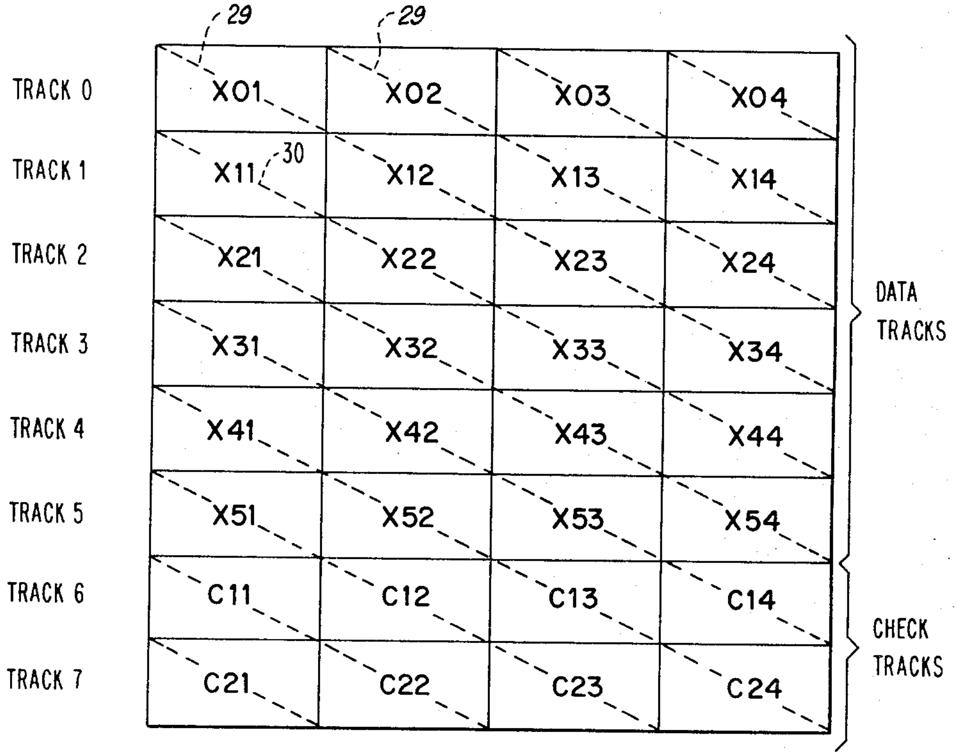
FIG. 5 illustrates the geometric relationships of data and check bits of one error correcting code.

Referring to FIG. 5, there is shown a chart indicating the geometric relationship between the data tracks and check bit tracks. The boxes labelled "X" are the data track cells or bit positions with the subscripts indicating the geometric location. The first subscript digit indicates the track, while the second subscript digit indicates the location of the bit in the track. Note that the byte is illustrated as being 4 bits long. Therefore, bit X01 is track 0 cell position 1. In a similar manner, the check bits C are geometrically identified. The syndrome $S_1$ and $S_2$ from the error correction code, include an array of cells which may contain two errors. It should be noted that the check bits are formed in two tracks appended to the parallel tracks or bytes of data. The data to be checked is represented in the table X01 through X54. Check digits C11 through C24 are the residue of the EXCLUSIVE OR function of all binary 1's contained in the data portion of the table which have a corresponding 1 in the encoding matrix of FIG. 8. For example, check digit C11 is the EXCLUSIVE OR or modulo 2 added result of all data bits XOI, XII, X21, X31, X41 and X51. In a similar manner, the other seven check digits are calculated. There are eight calculated syndrome bits:

S11, S12, S13, S14, syndrome byte 1
S21, S22, S23, S24, syndrome byte 2

It may be noted that the check digits C11 through C14 are the EXCLUSIVE OR sum of the vertical columns of FIG. 5. Check digits C21 through C24 are the EXCLUSIVE OR sum of three of the diagonals represented by dashed lines 29.

Referring to FIG. 2, showing a block diagram of a preferred embodiment handling a data block of 24 bits in 6 bytes, each of 4 bits, the received message enters decoder 6 at 40 and passes in parallel channels to first syndrome component computer 10, second syndrome component computer 12, and error corrector 22. $S_1$ computer 10 computes and emits at 14 syndrome component $S_1$, which passes by parallel channels to control signal generator 20, error computer 18 and modulo 2 adder 26. $S_2$ computer 12 computes and emits at 16 syndrome component $S_2$, which passes to control signal generator 20, and the error computer 18. The pointer latch circuits 28 receive pointer inputs signals $P_0$, $P_1$,...,$P_{kB1}$ and emit similar signals which pass to the control signal generator 20. The control signal generator 20 generates control signals $d$, I, $J_k$, $S_d$ and $S_e$ which pass to the error computer 18 and generates control signals $J_i$ which are sent to the error corrector 22. The control signal generator 20 also sends the $I_i$ signals to OR circuits 24 where they are OR'ed with similar I signals generated in and emitted by the error computer 18. The output of the OR circuits 24 is I signals which are sent to the error corrector 22. The error computer 18 computes and emits the error signals which are sent to a modulo 2 adder circuit 26. In single byte correction, error computer 18 emits a set of I signals to the control signal generator 20 and to the OR circuits 24. The modulo 2 adder circuit 26 computes $S_5$ from the $S_1$ input and the $S_4$ input. $S_5$ is sent to the error corrector 22. The error corrector computes the correct data $\hat{D}_0$, $\hat{D}_1$, ..., $\hat{D}_{k-1}$ from the $S_5$, $S_4$, data $D'_i$ and control signals I and J.

FIG. 3 shows the organization of the encoder. The data enters at 30 and is fanned out to four adders 32-1 to 32-4 calculating $C_1$ and four adders 34-1 to 34-4 calculating $C_2$. The output of each adder is the sum of its inputs, the addition being defined in GF(2). In FIG. 3, the data is shown in binary form as it is processed by a binary based machine, $X_{j,p}$ representing the $p^{th}$ bit of the $j^{th}$ byte.

The fanning scheme is according to the general principles described above. For the preferred embodiment, the four column vectors from GF(2) are chosen as:

$$I=\begin{pmatrix}0\\0\\0\\1\end{pmatrix},\ a^1=\begin{pmatrix}0\\0\\1\\0\end{pmatrix},\ a^2=\begin{pmatrix}0\\1\\0\\0\end{pmatrix},\ a^3=\begin{pmatrix}1\\0\\0\\0\end{pmatrix} \quad (17)$$

and the multiplication matrices are based on the irreducible polynomial $X^4+X+1$, giving:

$$I=\begin{bmatrix}1&0&0&0\\0&1&0&0\\0&0&1&0\\0&0&0&1\end{bmatrix}$$

$$T=\begin{bmatrix}0&1&0&0\\0&0&1&0\\1&0&0&1\\1&0&0&0\end{bmatrix}$$

$$T^2=\begin{bmatrix}0&0&1&0\\1&0&0&1\\1&1&0&0\\0&1&0&0\end{bmatrix}$$

$$T^3=\begin{bmatrix}1&0&0&1\\1&1&0&0\\0&1&1&0\\0&0&1&0\end{bmatrix}$$

$$T^4=\begin{bmatrix}1&1&0&0\\0&1&1&0\\1&0&1&1\\1&0&0&1\end{bmatrix}$$

$$T^5=\begin{bmatrix}0&1&1&0\\1&0&1&1\\0&1&0&1\\1&1&0&0\end{bmatrix}$$

The resulting encoding matrix is shown in binary form in FIG. 7.

The bit inputs 36 to adder 32-1 which calculates the first bit of check byte $C_1$ are shown in full in FIG. 3. These inputs correspond to to the direct row of $H_E$. Similarly, the inputs 38 to adder 34-2 calculating the second bit of the second check byte are shown. These correspond to the sixth row of $H_E$. The other inputs not shown in detail can be obtained by reference to $H_E$.

FIG. 4 shows the organization of the $S_1$ and $S_2$ syndrome computers 10,12 of FIG. 2. The received message enters at 40 and fans out to the adders 42-1 to 42-4 which calculate the bits of the first syndrome component $S_1$ and to the adders 44-1 to 44-4 calculating the bits of the second component $S_2$ in accordance with the decoding matrix expressed in binary form as shown in FIG. 9. The individual inputs shown for the adders can be obtained from $H_D$. The top four rows of $H_D$ are used to compute $S_1$ and the bottom four to compute $S_2$.

Figure 6:
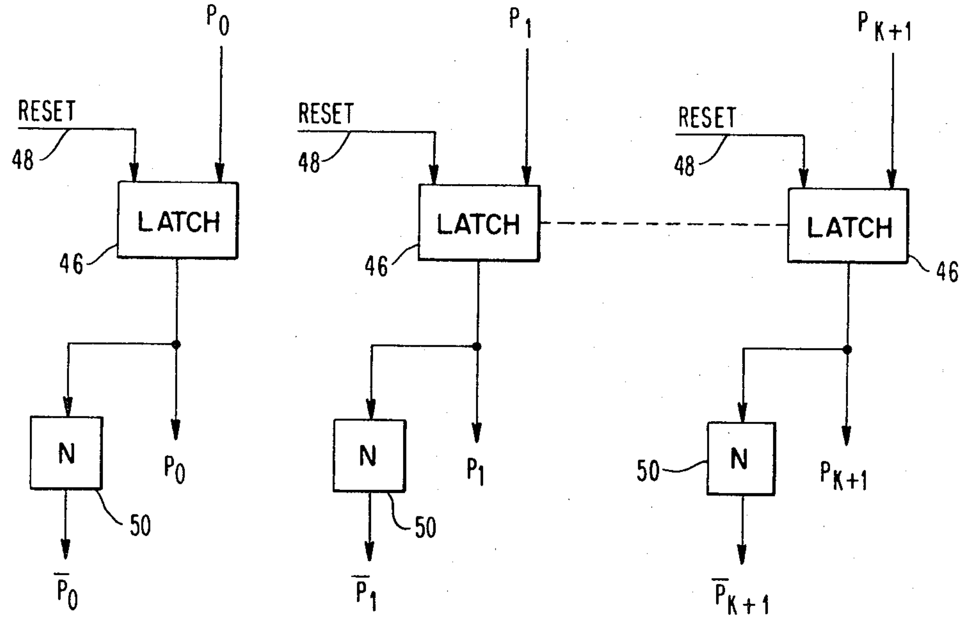
FIG. 6 is a schematic diagram showing the details of the pointer latch circuit of FIG. 2.

The pointer latch circuits 28 consists of an arrangement as shown in FIG. 6. Each pointer signal $P_i$ sets a latch circuit 46 if the pointer signal is a 1 indicating that an error is in the byte or track represented. There are as many latch circuits 46 as there are tracks. This includes the check tracks. Each of the latch circuits 46 has a reset 48 for resetting. A "NOT" circuit 50 is connected to the output of each latch circuit so that not only $P_0$, $P_1$, $P_{k+1}$ is obtained but that the inverse $\bar{P}_0$, $\bar{P}_1$, $\bar{P}_{k+1}$ is obtained. These pointer signals and their inverses are utilized as inputs to the control signal generator 20.

Figures 7A, 7B:
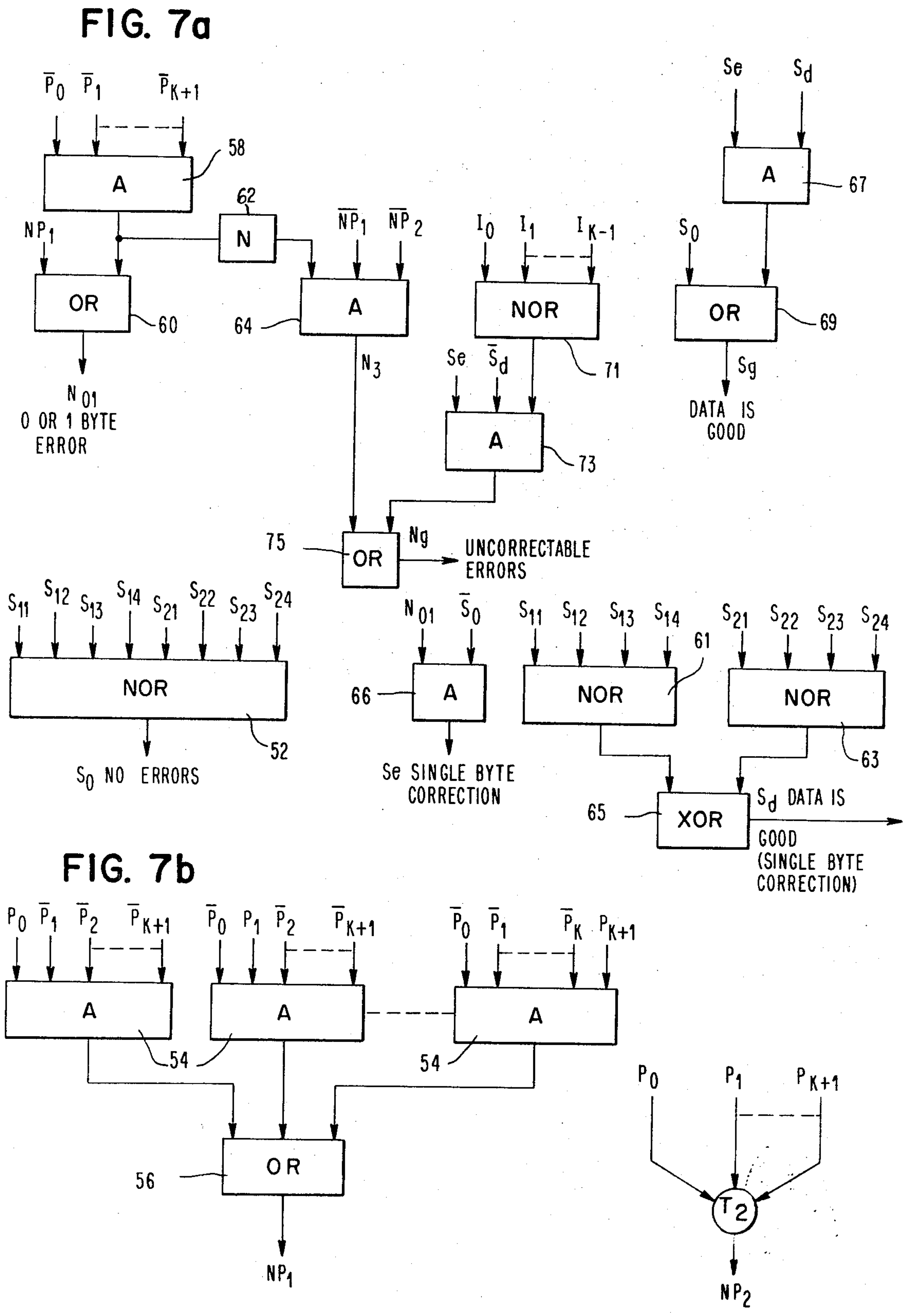

The control signal generator 20 as shown in FIGS. 7*a* through 7*e* receives the $S_1$ and $S_2$ syndrome signals from the $S_1$ and $S_2$ computer 10,12. These signals consist of a syndrome signal for each of the bits in the byte, namely, $S_{11}$, $S_{12}$, $S_{13}$, $S_{14}$ and syndrome $S_2=S_{21}$, $S_{22}$, $S_{23}$, $S_{24}$. It can be seen with reference to FIG. 7*a* that each of these syndrome signals are fed to a NOR circuit 52 which produces an output $S_0$ when both syndrome bytes are zero. This indicates that the data is correct. Referring to FIG. 7*b*, the pointer signals $P_0, P_1, \ldots, P_{k+1}$ and their inverses are fed to AND circuits 54 in the control signal generator 20 in such a manner that each of the pointer signals is essentially AND'ed with the inverse of the rest of the pointer signals and the results are OR'ed together in OR circuit 56 to produce an output $NP_1$ when one byte is in error as indicated by a pointer signal input. Similarly, the pointer signals are each fed to a circuit $T_2$ which is designed to emit an output signal when and only when, exactly two of its input lines have 1 signal thereon. Thus, the output of circuit $T_2$ is $NP_2$ which indicates that two pointers indicate errors in separate bytes. The inverse of the pointer signals, namely, $\overline{P}_0, \overline{P}_1, \ldots, \overline{P}_{k+1}$ is inputted to an AND circuit 58 in FIG. 7*a* which, when all the inputs are the same or correct, produces an output which is OR'ed in OR circuit 60 with the $NP_1$ signal generated in the arrangement previously discussed in connection with FIG. 7*b*. It will be appreciated that this OR circuit 60 will produce an output $N_{01}$ when there is no error or one error. The output of the ANd circuit 58 also passes through a NOT circuit 62 which essentially produces the inverse $\overline{NP}_0$. The output of the NOT circuit 62 serves as an input to an AND circuit 64 which has as other inputs thereto $\overline{NP}_1$ and $\overline{Np}_2$. The $NP_1$ signal indicates that one of the pointer signals indicates an error and the $NP_2$ signal indicates that two pointers indicate errors. Thus, the output $N_3$ of the AND circuit 64 indicates that more than two bytes are in error and thus an uncorrectable situation. The $N_{01}$ output from the OR circuit 60 is utilized as one of the inputs to an AND circuit 66 along with $\overline{S}_0$ as the other input. The $N_{01}$ signal indicates 0 or 1 errors whereas the $S_0$ signal indicates no errors. Since the input to the AND circuit 66 is the inverse of the $S_0$ signal along with the $N_{01}$ signal, the output signal $S_e$ indicates that a single byte correction should be done. A control signal $S_d$ is also generated in the signal generator 20 indicating that the data is good in the single byte correction made. This signal is generated by feeding the $S_{11}$, $S_{12}$, $S_{13}$ and $S_{14}$ syndrome signals to NOR circuit 61 and the $S_{21}$, $S_{22}$, $S_{23}$ and $S_{24}$ syndrome signals to a second NOR circuit 63. The outputs of the NOR circuits 61, 63 are fed as inputs to an EXCLUSIVE OR circuit 65 whose output is $S_d$.

The $S_d$ and $S_e$ signals are fed into an AND circuit 67 the output of which is fed to an OR circuit 69 which has the $S_0$ signal as the other input thereto. The OR circuit 69 produces an output $S_g$ indicating that the data is good.

The I signals received from the error computer 18 are inputted to a NOR circuit 71 whose output is fed to AND circuit 73 along with signals $S_e$ and $\overline{S}_d$. The output of AND circuit 73 is fed to an OR circuit 75 which has as its other input signal $N_3$. The output of OR circuit 75 is designated as signal $N_g$ indicating that uncorrectable errors exist.

Figure 7C:
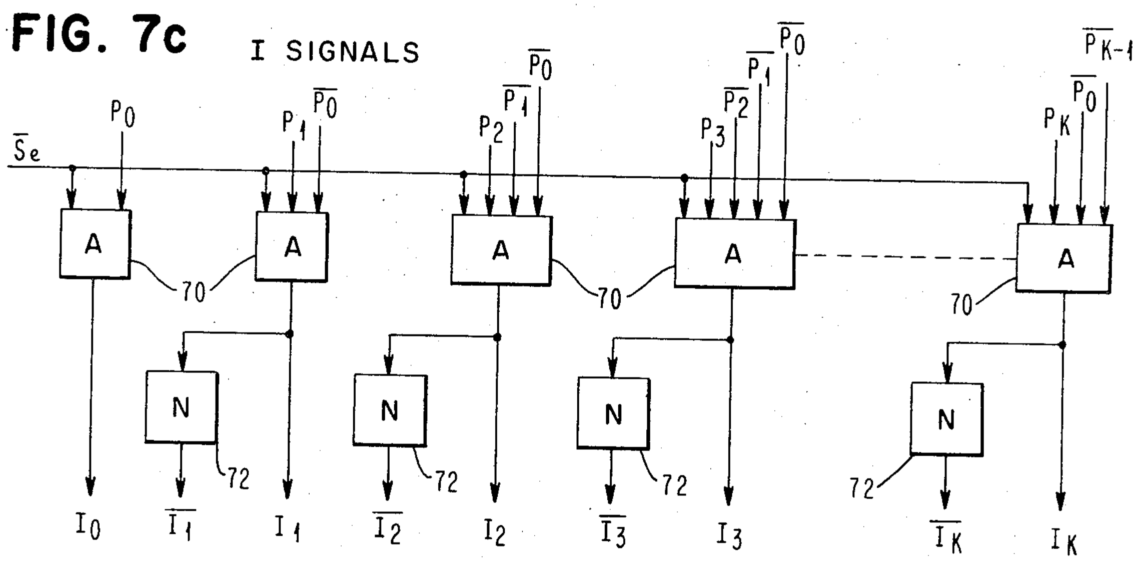

Referring to FIG. 7*c*, there is shown an array of AND circuits 70 and NOT circuits 72 which are capable of producing the $I_i$ signals $I_0, I_1, \ldots, I_k$ and the inverses thereof $\overline{I}_k$. This is accomplished by connecting the $\overline{S}_e$ signal to each one of the AND circuits 70 thereby preventing I signals when the system is performing the single error correction. It will be appreciated that the ANDing of each of the pointer signals with the NOT of the preceding pointer signals will produce the corresponding I signal when the designated pointer signal is in the 1 condition. For example, when $P_2$ is in a 0 state and likewise the preceding pointer signals $P_1$ and $P_0$ are also 0, the NOTing of the $P_1$ and $P_0$ signals will produce 1 signals and thus the AND circuit will provide a 0 output for $I_2$. However, assuming that the $P_2$ pointer signal is in the 1 condition indicating a byte in error, then all the inputs to the second AND circuit are 1's and $I_2$ will indicate a 1 output. Accordingly, the succeeding pointer signal inputs to the succeeding AND circuits will not produce an output since the inputs thereto can never be all in the same condition since they each include the NOT of the $P_2$ signal or other preceding signals that are turned on. Thus, the I signals will always indicate the first of the bytes in error. Each of the outputs of the AND circuits 70 except for $I_0$ are connected through a NOT circuit 72 to produce the inverse of the I signals $\overline{I}_1, \overline{I}_2, \ldots, \overline{I}_k$.

Figure 7D:
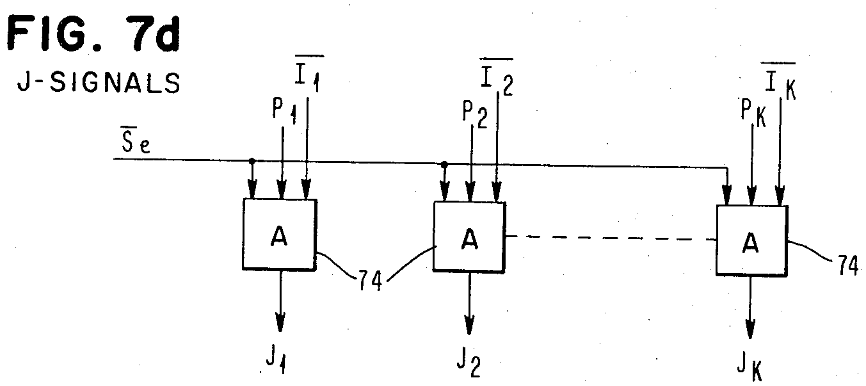

Referring to FIG. 7*d*, the AND circuits 74 for producing the $J_1, J_2, \ldots, J_k$ signals are shown. As previously mentioned, these J signals indicate the second byte that is in error. This is accomplished again by inputting to each of the separate AND circuits 74 the appropriate pointer signal and the inverse of the corresponding I signal along with the $S_e$ signal. Again, taking the second AND circuit 74 as an example, with $P_2$ indicating an ON pointer condition, that is, a 1 and $\overline{I}_2$ indicating a 1 since $P_2$ in the generation of the I signals produces a 1 output for the $I_2$ signal. Therefore, $\overline{I}_2$ would be a 0 signal. Thus, $J_2$ would have a 0 output. This makes sense since the I signals indicate the first byte in error and the J signals indicate the second byte in error. The $J_2$ signal represents the same byte as the signal $I_2$. However, if the $P_2$ signal had been a 0, that is, a pointer that does not indicate an error, then $\overline{I}_2$ would indicate a 1. Therefore, there would no output from the second AND circuit indicating that $J_2$ did not contain the second error.

Figure 7E:
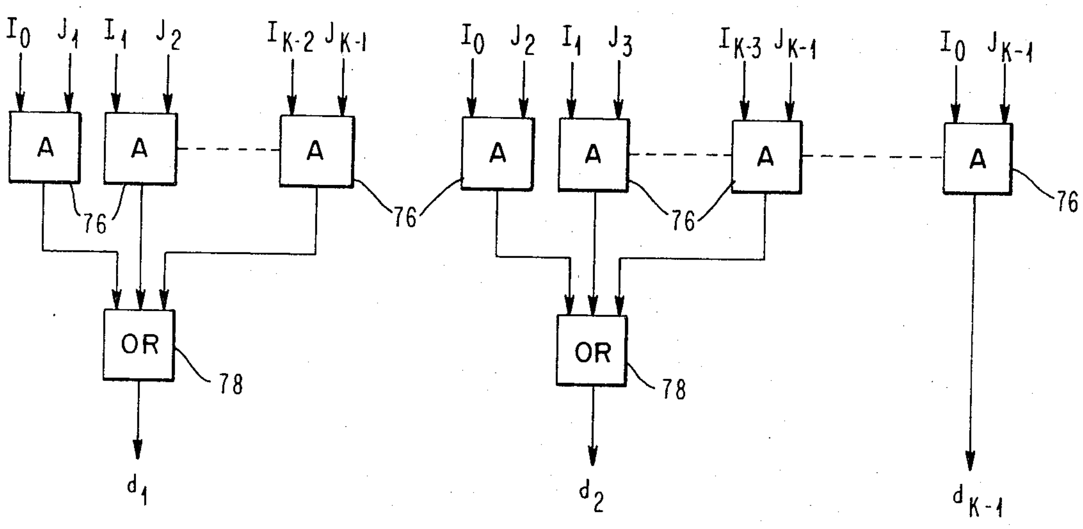

As has been previously pointed out, the distance signals $d_1, d_2, \ldots, d_{k-1}$ are generated through AND circuits 76 and OR circuits 78 which has as inputs the I and J signals to produce the successive distance signals *d* as shown in FIG. 7*e*. For example, the first group of AND signals compare adjacent I and J signals. In the first AND circuit, $I_0$ and $J_1$ are AND'ed, then $I_1$, $J_2$ are AND'ed, etc. until all the adjacent I's and J's have been AND'ed. The outputs of these AND circuits 76 are connected to an OR circuit 78 which will produce an output $d_i$ where $i$ represents the integers 1 through k−1. For example, the output $d_2$ represents that the distance between the Ith and Jth byte in error is 2. As previously mentioned, the distance signal is necessary for the calculations that are performed in the error computer 18 to be discussed. Thus, the first group of AND circuits 76 compares adjacent I and J signals whereas the second group compares twice removed I and J signals, the next three removed, etc. down to $I_0$, $J_{k-1}$ which is a comparison of the first I signal and the last J signal thereby producing $d_{k-1}$.

The organization of the error computer is shown in FIG. 10 and the mechanization is shown in FIGS 10*a*, 10*a*-1 and 10*a*-2 using an example of a block of data having 6 data bytes and two check bytes where each byte contains 4 bits. The computer is mechanized in accordance with the previously derived expression:

$$S_4 = S_1 \oplus (T^{j-i} \oplus 1)^{-1}(T^{-i}S_2 \oplus S_1)$$

The modulo 2 adder circuits 78 shown in FIG. 10*a* are computing the expression:

$$S_3 = T^{-i}S_2 \oplus S_1$$

The output of each of these EXCLUSIVE OR or modulo 2 adder circuits is fed to a respective AND circuit 80 along with one of the I signals $I_0$ through $I_5$. As has been previously explained, the 4 bit code or 4 bit per byte code has the syndrome signals represented by $S_1 = S_{11}$, $S_{12}$, $S_{13}$, $S_{14}$ and the $S_2$ syndrome represented by $S_{21}$, $S_{22}$, $S_{23}$, $S_{24}$, thus, each of the I signals is gated with a byte of syndrome data. It should be appreciated that the $S_2$ signals or syndromes EXCLUSIVE OR'ed with the $S_1$ syndrome bits are determined in accordance with Galois Field theory as represented by $T^{-i}$ in the equation. The output from the corresponding bit AND circuit of each byte is OR'ed together to form $S_3$ or the syndrome outputs $S_{31}$, $S_{32}$, $S_{33}$, $S_{34}$. For simplicity, this OR operation of the outputs of the bit AND circuits 80 is indicated by a dot in FIG. 10 and is sometimes referred to as the DOT OR function. The inputs to AND circuits 80 are also fed into respective NOR circuits 81 along with the signal $\overline{S}_e$ to produce the output I signals for single byte correction. The syndrome bit outputs are modulo 2 combined in order to compute the expression $S_4 = (T^{j-i} \oplus 1)^{-i}S_3$ in FIGS. 10*b* and 10*b*-1. The inputs to the modulo 2 adder circuits 82 are determined in accordance with Galois Field theory GF($2^b$) as previously discussed. The output of each modulo 2 adder circuit 82 is fed to a respective AND circuit 84. Each group of four AND circuits represents the 4 bits of the byte $S_4$ where each input is gated by the appropriate distance signal $d_1 \ldots d_6$. Thus, the first group or byte of four AND circuit 84 has an input distance signal $d_2$, etc. through $d_6$. The AND circuit 84 output of corresponding bit positions of each group is dot OR'ed together to produce the desired error signals $e_{j1}$, $e_{j2}$, $e_{j3}$ and $e_{j4}$ representing the error pattern $S_4 = e_j$ in the second byte in error. This OR operation at the outputs of AND circuits 80 and the AND circuits 84 is possible due to the fact that at most one and only one I signal is active, and at most one $d$ signal or the signal $J_k$ is active. These $e_j$ signals are connected as inputs to respective EXCLUSIVE OR circuits 26 wherein the other input is the $S_1$ syndrome bits $S_{11}$, $S_{12}$, $S_{13}$, and $S_{14}$ as shown in FIG. 10*b*. The output from the EXCLUSIVE OR circuits 26 is $S_5 = e_i = e_{i1}$, $e_{i2}$, $e_{i3}$ and $e_{i4}$ which represents the error pattern for the first byte in error.

Referring to FIGS. 11 and 11*a*, the error corrector 22 mechanization is shown wherein the received data that is in error is corrected by adding the appropriate error pattern thereto to obtain the corrected data $\hat{D}_0$, $\hat{D}_1, \ldots, \hat{D}_{k-1}$. As has been previously shown, the inputs to the error corrector 22 are the error patterns $S_5 = e_i$ and $S_4 = e_j$ the received data $D'_0$, $D'_1, \ldots, D'_{k-1}$ and the I and J signal inputs. The $e_i$ error pattern and the $e_j$ error pattern are connected as inputs to AND circuit 86 with the corresponding I and J signals. For example, referring to the second byte of data $D_{11}$, $D_{12}$, $D_{13}$ and $D_{14}$, each of the error bits $e_{i1}$, $e_{i2}$, $e_{i3}$ and $e_{i4}$ is AND'ed with the corresponding I signal $I_1$. Similarly, the error bit signals $e_{j1}$, $e_{j2}$, $e_{j3}$ and $e_{j4}$ are each connected as an input to a separate AND circuit 86 along with the input J. The output of both of these AND circuits connected as an input to a modulo 2 adder circuit 88 which has a third input the data. The output of the modulo 2 adder circuit 88 is the corrected corresponding bit of the data. For example, $D_{11}$, $D_{12}$, $D_{13}$, $D_{14}$ is connected to modulo 2 adder circuits 88 along with the output from the AND circuits 86 to produce as an output the corrected data $\hat{D}_{11}$, $\hat{D}_{12}$, $\hat{D}_{13}$ and $\hat{D}_{14}$. An analysis of the circuit indicates that if there is an error, for example, in the data bit $D_{11}$, 1 then $e_{i1} = 1$ and $I_1 = 1$ indicating the bit 1 of byte $d_1$ is in error, and the AND gate 86 which receives $e_{i1}$ and $E_1$ will produce a 1 output, which is EXCLUSIVE OR'ed in 88 with the received data bit $D_{11}$ to produce the correct bit $\hat{D}_{11} = D_{11} \oplus e_{i1}$. Note that since $i$ and $j$ signals cannot exist for the same byte, then the AND circuit 86 receiving $e_{j1}$ and $J_1$ will be zero, and have no effect on the EXCLUSIVE OR circuit 88. The $\hat{D}$ is equal to the corrected value of the received data D. Actually, the corrected data should be the same as the original or transmitted data.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. Apparatus for encoding a message to be sent and decoding a received message of blocks of data having $k$ bytes of $b$ bits each to correct any two bytes in error regardless of the number of bits in error within said two bytes comprising:

an encoder for encoding the data by adding to each block of data two check bytes which are related to the data in accordance with the equation:

$$C_1 = ID_0 \oplus ID_1 \oplus ID_2 \oplus ID_3 \ldots ID_{k-1}$$

and $$C_2 = ID_0 \oplus TD_1 \oplus T^2D_2 \oplus \ldots \oplus T^{k-1} D_{k-1}$$

respectively, wherein I is the identity element and T, $T^2$, $T^3 \ldots T^{k-1}$ are distinct non-zero elements of Galois Field ($2^b$), wherein the indicated multiplication and addition are the Galois Field defined operations, and wherein $b$ is an integer > 1, and $k$ is an integer $2 < k < 2^b$;

a decoder including pointer signal receiving means for storing pointer signals which indicate the byte in error;

said decoder including an error signal computing means for generating error signals indicative of the bits in error in each of two bytes in error indicated by the pointer signal receiving means; and error correcting means utilizing said error signals from said error signal computing means for correcting said bytes in error.

2. Apparatus according to claim 1, wherein said decoder includes a first and second syndrome computer which computes $S_1$ and $S_2$ syndrome signals from the block of data and the check bits $C_1$ and $C_2$ according to the equations:

$S_1 = ID'_0 \oplus ID'_1, \ldots ID'_{k-1} \oplus IC'_1$ $[S_2 = ID_0 + TD_1 + T^2D_2 + T^3D_3, \ldots T^{k-1}D_k]$ $S_2 = ID'_0 \oplus TD'_1 \oplus T^2 D'_2 \oplus T^3 D'_3, \ldots T^{k-1} D'_{4-3} \oplus C'_2$ 3. Apparatus according to claim 2, wherein said decoder includes a control signal generator which receives as inputs thereto said $S_1$ and $S_2$ syndrome signals and said pointer signals from said pointer signal receiving means and generates therefrom first byte in error identifying signals $I_0, I_1, \ldots I_k$; second byte in error identifying signals $J_1, J_2, \ldots, J_k$ and distance between first and second byte in error identifying signals $d_1, d_2, \ldots, d_{k-1}$.

4. Apparatus according to claim 3, wherein said control signal generator further generates signal $N_{01}$, indicating one or no errors, signal $N_g$ designating uncorrectable errors exist, signal $S_0$ indicating no errors and signal $S_e$ indicating a single byte correction should be done and in the presence of $S_e$, signal $S_d$ indicating the error is in one of the check bytes and not the data.

5. Apparatus according to claim 3, wherein said error signal computing means includes modulo 2 adder circuits arranged to solve the syndrome equation $S_3 = T^{-1} S_2 \oplus S_1$ and AND circuits for gating the outputs of said modulo 2 adder circuits by the first byte in error identifying signal $I_0, I_1, I_2, \ldots, I_{k-1}$ generated by said control signal generator.

6. Apparatus according to claim 5, wherein said error signal computing means further includes a second plurality of modulo 2 adder circuits arranged to multiply (modulo 2) syndrome $S_3$ by $(T^{j-i} \oplus I)^{-1}$ and a second plurality of AND circuits for gating the outputs of said second plurality of modulo 2 adder circuits by said distance signals $d$ to obtain the error signal $S_4 = (T^{j-i} \oplus I)^{-1} S_3 = e_j$.

7. Apparatus according to claim 6, wherein an EXCLUSIVE OR circuit is provided having as one input thereto the error signals generated by said error signal computing means and the syndrome $S_1$ output from said $S_1$ syndrome computer which produces an output signal in accordance with the equation $S_5 = S_1 \oplus S_4 = e_i$.

8. Apparatus according to claim 1, wherein said error correcting means includes modulo 1 adder means for adding the error computed in said decoder to the received data to thereby reproduce the sent data.

9. Apparatus according to claim 8, wherein said error correcting means includes a third plurality of AND circuits for gating the error signals $S_4 = e_j$ by the J signals from the control signal generating means and the $S_5 = e_i$ signals from said EXCLUSIVE OR circuit by the I signals from the control signal generating means and further includes a third plurality of modulo 2 adder circuits having as inputs thereto the corresponding bit position outputs from said third plurality of AND circuits and the corresponding data bit from the related data byte thereby adding the errors $e_j$ and $e_i$ computed by said error signal computing means and said EXCLUSIVE OR circuit to said received data $D'_0, D'_1, \ldots D'_{k-1}$ to reproduce the sent message.

10. Apparatus according to claim 3, wherein said I signals $I_0, I_1, I_2, \ldots, I_{k-1}$ are generated by a fourth plurality of AND gates for gating each pointer signal P with the inverse pointer signal $\overline{P}$ of each preceding pointer signal.

11. Apparatus according to claim 10, wherein said J signals $J_1, J_2, \ldots, J_k$ are generated by a fifth plurality of AND gates for gating each pointer signal P with the inverse of the corresponding I signals to produce the J SIGNALS $J_1, J_2, \ldots, J_k$.

12. Apparatus according to claim 11, wherein a sixth plurality of AND gates are provided for gating each I signal with each adjacent J signal and then each twice removed J signal increasing the distance between signals being gated by one signal each time until reaching the gating of the first I signal $I_0$ with the last J signal $J_{k-1}$, the output of each group of AND circuits being OR'ed in a second EXCLUSIVE OR circuit to produce the distance signals $d$, the subscript integer representing the actual distance.

* * * * *

PO-1050
(5/69)

UNITED STATES PATENT OFFICE
CERTIFICATE OF CORRECTION

Patent No. 3,697,948 Dated October 10, 1972

Inventor(s) Douglas C. Bossen

It is certified that error appears in the above-identified patent and that said Letters Patent are hereby corrected as shown below:

Column 18, line 2, the number "1" should read --2--.

Signed and sealed this 22nd of May 1973.

(SEAL)
Attest:

EDWARD M.FLETCHER,JR.
Attesting Officer

ROBERT GOTTSCHALK
Commissioner of Patents 623-2721-0